US011102005B2

(12) United States Patent
Kurian et al.

(10) Patent No.: US 11,102,005 B2
(45) Date of Patent: Aug. 24, 2021

(54) INTELLIGENT DECRYPTION BASED ON USER AND DATA PROFILING

(71) Applicant: Bank of America Corporation, Charlotte, NC (US)

(72) Inventors: Manu J. Kurian, Dallas, TX (US); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 101 days.

(21) Appl. No.: 16/750,666

(22) Filed: Jan. 23, 2020

(65) Prior Publication Data
US 2021/0234693 A1 Jul. 29, 2021

(51) Int. Cl.
| | |
|---|---|
| *H04L 29/06* | (2006.01) |
| *H04L 29/08* | (2006.01) |
| *H04L 9/06* | (2006.01) |
| *H04L 9/32* | (2006.01) |
| *H04L 9/14* | (2006.01) |
| *G06F 21/60* | (2013.01) |

(52) U.S. Cl.
CPC .......... *H04L 9/3213* (2013.01); *G06F 21/602* (2013.01); *H04L 9/0618* (2013.01); *H04L 9/14* (2013.01)

(58) Field of Classification Search
CPC ....... G06F 21/602; H04L 9/0618; H04L 9/14; H04L 67/32; H04L 63/205; H04L 63/0428
See application file for complete search history.

(56) References Cited

U.S. PATENT DOCUMENTS

| | | | |
|---|---|---|---|
| 5,742,756 | A | 4/1998 | Dillaway et al. |
| 6,084,968 | A | 7/2000 | Kennedy et al. |
| 6,389,542 | B1 | 5/2002 | Flyntz |
| 7,010,681 | B1 | 3/2006 | Fletcher et al. |
| 7,130,998 | B2 | 10/2006 | Balfanz et al. |
| 7,140,044 | B2 | 11/2006 | Redlich et al. |
| 7,322,047 | B2 | 1/2008 | Redlich et al. |

(Continued)

OTHER PUBLICATIONS

Kurian, M. J. et al., "Sleeper Keys ," U.S. Appl. No. 16/750,508, filed Jan. 23, 2020, 67 pages.

(Continued)

*Primary Examiner* — Mohammad A Siddiqi
(74) *Attorney, Agent, or Firm* — Michael A. Springs

(57) ABSTRACT

A non-transitory computer-readable medium includes an encrypted dataset, a first access control measure, and instructions. The encrypted dataset includes a first encrypted block of data, encrypted using a first encryption algorithm, and a second encrypted block of data, encrypted using a second encryption algorithm stronger than the first. The first access control measure is associated with a first access control characteristic and is configured to selectively prevent access to the encrypted dataset. The instructions are configured, when executed by a processor of a device of a first user, to determine that a first characteristic of the first user matches the first access control characteristic. In response, the instructions are configured to decrypt the encrypted dataset to form a plain text dataset and provide the device of the first user access to the plain text dataset. Decrypting the encrypted dataset includes decrypting the first and second blocks of data.

20 Claims, 9 Drawing Sheets

(56) References Cited

U.S. PATENT DOCUMENTS

| | | |
|---|---|---|
| 7,406,601 B2 | 7/2008 | Hamid |
| 7,447,903 B2 | 11/2008 | Sandhu et al. |
| 7,546,334 B2 | 6/2009 | Redlich et al. |
| 7,552,322 B2 | 6/2009 | Balfanz et al. |
| 7,669,051 B2 | 2/2010 | Redlich et al. |
| 7,779,267 B2 | 8/2010 | Chen et al. |
| 7,849,303 B2 | 12/2010 | Miller |
| 7,958,268 B2 | 6/2011 | Redlich et al. |
| 7,995,603 B2 | 8/2011 | Revital et al. |
| 8,341,714 B2 | 12/2012 | Muller et al. |
| 8,407,475 B2 | 3/2013 | Ganesan et al. |
| 8,619,982 B2 | 12/2013 | Sitrick et al. |
| 8,634,553 B2 | 1/2014 | Hata et al. |
| 8,719,954 B2 | 5/2014 | Sitrick et al. |
| 8,832,466 B1 * | 9/2014 | McGregor, Jr. ....... H04L 9/0618 |
| | | 713/193 |
| 9,065,763 B2 | 6/2015 | Kasztenny et al. |
| 9,231,952 B2 | 1/2016 | Relyea et al. |
| 9,246,676 B2 | 1/2016 | Leavy et al. |
| 9,306,917 B2 | 4/2016 | Brugger et al. |
| 9,325,671 B2 | 4/2016 | Rohloff |
| 9,628,450 B2 | 4/2017 | Rohloff |
| 9,679,118 B2 | 6/2017 | Sitrick et al. |
| 9,805,365 B2 | 10/2017 | Chen et al. |
| 9,881,300 B2 | 1/2018 | Reese et al. |
| 9,930,040 B2 | 3/2018 | Yu Quach et al. |
| 9,954,680 B1 | 4/2018 | Machani et al. |
| 10,291,589 B1 * | 5/2019 | Sharifi Mehr .......... H04L 67/32 |
| 10,291,657 B2 | 5/2019 | Narayanaswamy et al. |
| 2002/0051540 A1 * | 5/2002 | Glick .................. H04L 63/1408 |
| | | 380/258 |
| 2005/0050330 A1 | 3/2005 | Agam et al. |
| 2005/0081039 A1 | 4/2005 | Lee et al. |
| 2005/0138421 A1 | 6/2005 | Fedronic et al. |
| 2006/0126843 A1 * | 6/2006 | Brickell ................. H04L 9/0637 |
| | | 380/260 |
| 2007/0106536 A1 | 5/2007 | Moore |
| 2007/0132548 A1 | 6/2007 | Baraz et al. |
| 2007/0199058 A1 | 8/2007 | Baumgart et al. |
| 2008/0133935 A1 * | 6/2008 | Elovici .................... H04L 63/08 |
| | | 713/193 |
| 2009/0106801 A1 | 4/2009 | Horii |
| 2010/0296651 A1 * | 11/2010 | Tkacik .................. H04L 9/0894 |
| | | 380/44 |
| 2012/0226536 A1 | 9/2012 | Kidron |
| 2013/0142336 A1 | 6/2013 | Fries et al. |
| 2018/0294952 A1 * | 10/2018 | Yuan .................... G06F 21/6227 |
| 2019/0026502 A1 * | 1/2019 | Segev .................. G06F 21/6227 |

OTHER PUBLICATIONS

Kurian, M. J. et al., "Intelligent Encryption Based on User and Data Profiling," U.S. Appl. No. 16/750,545, filed Jan. 23, 2020, 62 pages.

* cited by examiner

INTELLIGENT DECRYPTION BASED ON USER AND DATA PROFILING

TECHNICAL FIELD

The present disclosure relates generally to database security, and more particularly, to a system and method for performing intelligent decryption based on user and data profiling.

BACKGROUND

A data store is a repository for storing data. Data files stored in a data store may have a variety of formats and a variety of security requirements. A user requesting access to data files may provide a form of authentication, such as a password, in order to access the data files. Once the data store has granted the user access to the data files, the data store may encrypt the data files before transmitting the files to the user. There exists a need for improved systems and methods for controlling access to files in a data store.

SUMMARY

A data store may store a variety of files of different types and with a variety of security requirements. Some form of validation may be appropriate before files in a data store can be accessed. For instance, a user may provide a login credential, such as a password, in order to gain access to files in the data store. In some cases, a security token, such as a near-filed communication (NFC) token or universal serial bus (USB) token, may be used instead of or in addition to a password to access information stored in a data store. However, previous tools generally provided generic access to all files in the data store such that all files in the data store can be accessed by any user having the appropriate credentials and/or token. This can result in inefficient use of resources, such that separate data stores being used to store information with different security requirements. Certain files may be stored multiple times in these different data stores (e.g., a high security data store may store copies of files already available in a low security data store). Previous technology also failed to take into account how a user is using data in the data store. Suspicious usage profiles cannot be detected to prevent data compromise by bad actors. In many cases, previous access tokens transmit credentials by default, allowing bad actors to intercept these credentials and use them to gain access to sensitive files.

Additional issues with previous tools arise when transmitting data to users over a network. For example, while conventional tools may encrypt the data prior to transmitting it to a user, such encryption is typically performed on an all-or-nothing basis, leading to an inefficient use of processing resources both when encrypting and decrypting the data. As an example, previous tools may encrypt the entire contents of a 10 GB file, the majority of which is public information, simply because the file contains a single social security number. As another example, previous tools may apply the same security measures to data transmitted to trusted users located on an internal network as to data transmitted to new users located in untrusted geographical regions.

The systems described in this disclosure provide technical solutions to the technical problems of previous systems, including those described above, by facilitating more reliable and secure data access and management. Certain embodiments are described below.

In one embodiment, a system includes an authorization token with a memory configured to store user attributes including a record of previous usage of the data store by the user, pre-authorization data for the user, and an access signature for accessing contents of a data store. The authorization token receives an authorization request. Following receipt of the authorization request, session attributes are collected associated with a file path used by the user to request access to the file. Based on the pre-authorization data, the token determines that the user is provisionally permitted access to the file. A consistency measure is determined associated with whether the file path used by the user to request access to the file is consistent with a previous file path stored in a record of previous usage of the data store by the user. The previous file path is associated with a file to which the user was previously granted access. In response to determining that the consistency measure is greater than a threshold value, the access signature is provided to the data store, thereby granting the user access to the file. In response to determining that the consistency measure is less than or equal to the threshold value, the token prevents provisioning of the access signature to the data store, thereby preventing the user from accessing the file.

In another embodiment, a system includes a data store, a memory, and a hardware processor communicatively coupled to the memory. The data store includes a dataset. The dataset includes a first block of data and a second block of data. The memory stores a first encryption algorithm and a second encryption algorithm. The second encryption algorithm is stronger than the first encryption algorithm. The hardware processor receives a request to transmit the dataset to a device of a first user. In response to receiving the request, the processor encrypts the dataset to form an encrypted dataset. Encrypting the dataset includes determining, based on a characteristic of the first block of data, a first level of security for the first block of data. In response to determining the first level of security for the first block of data, encrypting the dataset also includes encrypting the first block of data. Encrypting the first block of data includes applying the first encryption algorithm to the first block of data. The first encryption algorithm is assigned to the first level of security. Encrypting the dataset additionally includes determining, based on a characteristic of the second block of data, a second level of security for the second block of data. In response to determining the second level of security for the second block of data, encrypting the dataset further includes encrypting the second block of data. Encrypting the second block of data includes applying the second encryption algorithm to the second block of data. The second encryption algorithm is assigned to the second level of security. The processor also determines a first characteristic of the first user. The processor additionally applies a first access control measure to the encrypted dataset, based on the first characteristic of the first user. The first access control measure prevents a device of a second user from accessing the encrypted dataset, wherein a first characteristic of the second user is incompatible with the first characteristic of the first user. The processor further transmits the encrypted dataset with the first access control measure to the device of the first user.

In yet another embodiment, a non-transitory computer-readable medium includes an encrypted dataset, a first access control measure, and instructions. The encrypted dataset includes a first encrypted block of data and a second encrypted block of data. The first encrypted block of data was encrypted using a first encryption algorithm. The second encrypted block of data was encrypted using a second encryption algorithm. The second encryption algorithm is stronger than the first encryption algorithm. The first access control measure is configured to selectively prevent access to the encrypted dataset. The first access control measure is associated with a first access control characteristic. The instructions are configured, when executed by a hardware processor of a device of a first user, to determine that a first characteristic of the first user matches the first access control characteristic. In response to determining that the first characteristic of the first user matches the first access control characteristic, the instructions are configured to decrypt the encrypted dataset to form a plain text dataset. Decrypting the encrypted dataset includes decrypting the first block of data and decrypting the second block of data. The instructions are also configured to provide the device of the first user access to the plain text dataset.

The disclosed systems and methods provide several advantages which include (1) providing an adaptive authorization token, or "sleeper key," which is largely maintained in an inactive state when not in use; (2) updating user-specific authorization instructions based on previous user activity; (3) preventing or decreasing the compromise of secure files by flagging irregular user activities; (4) dynamically adjusting encryption levels and security measures applied to data prior to transmitting the data to a user, based on profiling of both the user and the data; and (5) generating a self-decryption mechanism that is transmitted to the user along with the encrypted data, and that includes one or more checks to help ensure that the encrypted data has been received by its intended recipient.

As an example, the adaptive authorization token described in this disclosure may track user activity (e.g., in terms of usage of one or more data stores, location history, and the like), identify any out-of-the-ordinary activity, and update the user's authorization instructions (i.e., which file types may be accessed by the user) based on any such identified activities. In some embodiments, the adaptive security token only becomes "active" for providing authorization to access files in a data store only after certain criteria are met (e.g., criteria associated with the extent to which a user's current activity is consistent with past activity). As such, the systems described in this disclosure may improve the function of computer systems used for securely authorizing access to information in data stores. The systems described in the present disclosure may be integrated into a variety of practical applications for providing secure control of access to files in a data store in a manner that reduces the risks of unauthorized access via automatic adjustments to user authorization. Furthermore, maintaining an adaptive authorization token in an inactive, or "sleeping," state until authorization is approved significantly limits the likelihood that authorization credentials (e.g., an authorization signature) is compromised. Examples of adaptive authorization tokens and their use are described below with respect to FIGS. 1-4.

As another example, the encryption module described in this disclosure may dynamically encrypt and/or apply access controls to a given file, based on characteristics of both the data included in the file and the user requesting the file. For example, the encryption module may determine that certain portions of the file correspond to confidential, sensitive, and/or important information and, accordingly, apply a high level of encryption to such portions. On the other hand, the encryption module may identify other portions of the file that correspond to public information and apply a low level of encryption (or no encryption) to such portions. By applying different levels of encryption to different portions of a given file, the encryption module may save processing resources as compared to conventional encryption methods, which typically encrypt files on an all-or-nothing basis. Additionally, the encryption module may apply a set of access controls to the encrypted file, tailored to the attributes of the user requesting the file, thereby helping to prevent unintended recipients from decrypting and accessing the contents of the file. The encryption module may also generate a self-decryption module configured to automatically remove any access controls and decrypt the encrypted file, once the encrypted file has reached its intended recipient. The systems described in the present disclosure may be integrated into a variety of practical applications for secure file transfers in a manner that reduces the risks of unauthorized access by tailoring the level of encryption to the sensitivity of the transmitted data and tailoring the number and types of access controls to the user requesting the data. Examples of such tailored encryption/decryption are described below with respect to FIGS. 5-8.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to the present disclosure, there was a lack of tools for efficiently and securely managing access to files in a data store. As described with respect to the illustrative examples of FIGS. 1 through 9 below, the present disclosure facilitates more secure and reliable control of data store access and management. As used in this disclosure, a data store refers to any computing device or collection of devices configured to function as a repository for storing a collection of data. For example, a data store may include one or more databases (e.g., structured collections of data). A data store may also or alternatively store other file types (e.g., data files, executable files, and the like).

Example Data Store System

Figure 1:
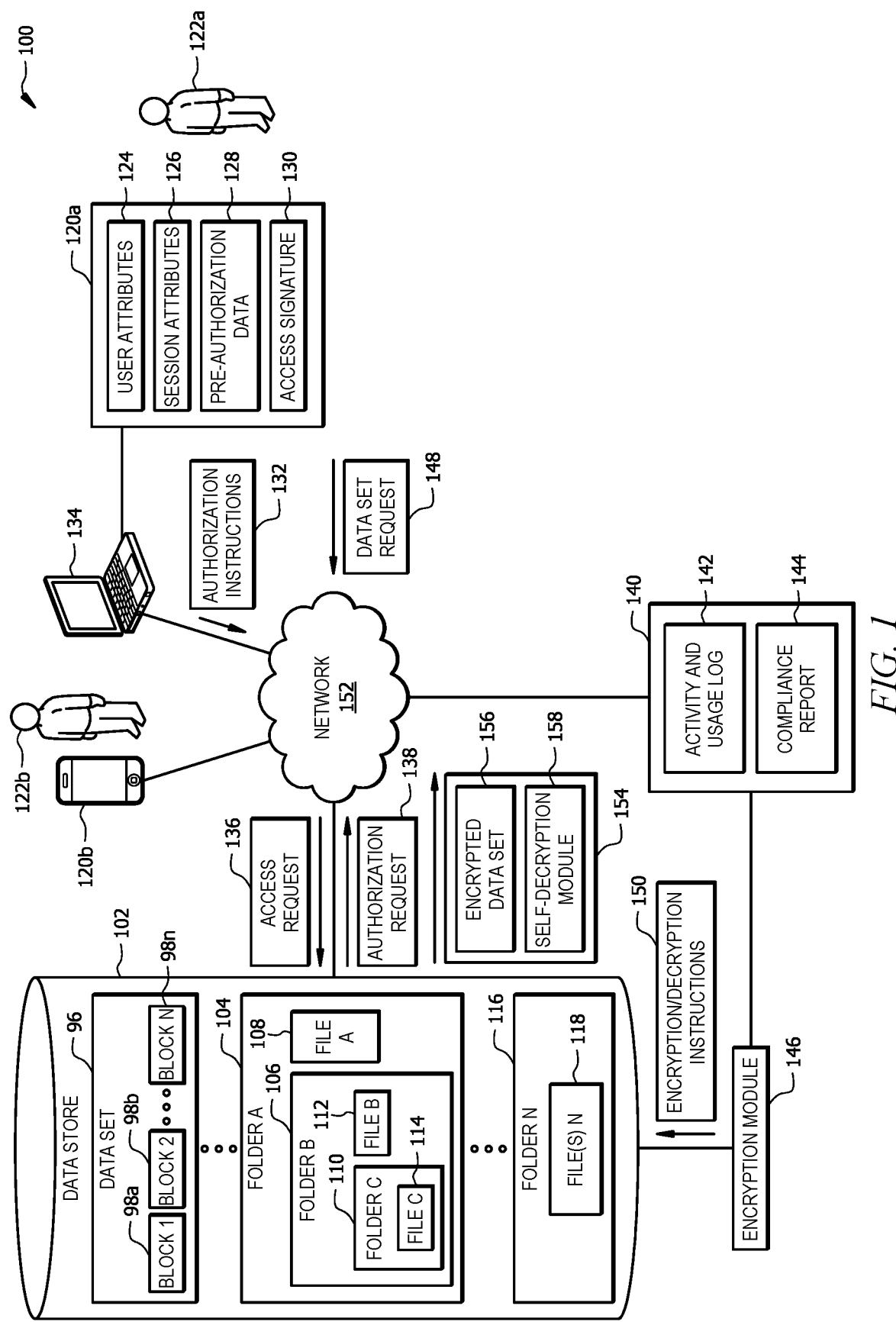
FIG. 1 is a schematic diagram of an example data store system.

FIG. 1 is a diagram of an example data store system 100, according to an illustrative embodiment of this disclosure. The data store system 100 includes a data store 102, a first adaptive authorization token 120a associated with a first user 122a, a second adaptive authorization token 120b associated with a second user 122b, a computing device 134, a usage tracker 140, an encryption module 146, and a network 152. Users 122a,b may include any appropriate users of data store system 100. For example, users 122a,b may be internal users, accessing data store 102 over an internal network 152, or external users, accessing data store 102 over an external network 152. The data store system 100 is generally configured to facilitate efficient and secure access to data stored in data store 102. For example, data store system 100 may be configured to facilitate efficient and secure access to an appropriate subset of folders 104, 106, 110, 116 and files 108, 112, 114, 118 stored in data store 102.

The adaptive authorization tokens 120a,b, which may also be referred to as sleeper keys 120a,b, generally collect information associated with how users 122a,b interact with data store 102 and/or other activities of the users 122a,b and use this information, at least in part, to control the user's permission (e.g., by either confirming or denying authorization) for accessing one or more of the files 108, 112, 114, 118. For example, an adaptive authorization token 120a,b may compare current usage and activity of a corresponding user 122a,b to expected usage or activity (e.g., based on information in the activity log(s) 142) to determine whether authorization for file access should be allowed. If the current usage and activity is consistent within expectations, the adaptive authorization tokens 120a,b may become active to provide authorization instructions 132 such that the user 122a,b may access a requested file in the data store 102. However, if the current usage and activity is not consistent within expectations, the user 122a,b may be denied authorization to access a requested file in the data store 102, as described in greater detail with respect to FIGS. 2-4 below. Tracked information may be provided to the usage tracker 140 for storage in activity and usage log(s) 142.

In some embodiments, the encryption module 146 may be configured to encrypt data stored in data store 102 and/or to apply access controls to the data prior to transmitting the data to user 122a,b. In certain embodiments, encryption module 146 may proactively adjust encryption levels and/or access controls based on characteristics of the data to be transmitted and/or characteristics of the user requesting the data. In some embodiments, encryption module 146 may transmit a self-decryption module 158 to user 122a,b, along with the encrypted data. Self-decryption module 158 may include a set of instructions generated by encryption module 146, based on encryption/decryption instructions 150, and configured to automatically execute on a device of the recipient of the encrypted data, to decrypt the data. Encryption module 146 is described in further detail below, in the discussion of FIGS. 5 through 8. The data store system 100 may be configured as shown or in any other suitable configuration.

The data store 102 is generally any appropriate computing device or collection of computing devices configured to store a collection of data. Data store 102 may store data in any suitable format. At a high level of generality, data store 102 may store any number of datasets 96, with each dataset 96 including any number of blocks of data 98a through 98n. As a specific example, data store 102 of FIG. 1 may store a plurality of files 108, 112, 114, 118, where the files 108, 112, 114, 118 may be stored in folders 104, 106, 110, 116 as shown in the example of FIG. 1. In such an example, a block of data 98 may correspond to (1) a file 108, 112, 114, and/or 118; (2) a part of a file 108, 112, 114, and/or 118; (3) a folder 104, 106, 110, and/or 116; (4) a part of a folder 104, 106, 110, and/or 116; and/or (5) any other appropriate piece of data. A dataset 96 may then correspond to (1) one or more files 108, 112, 114, 118; (2) one or more parts of files 108, 112, 114, 118; (3) one or more folders 104, 106, 110, 116; (4) one or more parts of folders 104, 106, 110, 116; and/or (5) any other appropriate collection of pieces of data.

As illustrated in the example of FIG. 1, each folder 104, 106, 110, 116 may include at least one file 108, 112, 114, 118 and/or another folder (e.g., as shown in the nested folders 104, 106, and 110). Files 108, 112, 114, 118 may be of any file type. For instance, one or more of files 108, 112, 114, 118 may be executable files used to execute processes of an application. For instance the files may include code for executing a task of an application. Files 108, 112, 114, 118 may also or alternatively include any other files needed to implement the function of, or perform tasks associated with, these or other applications. For instance, one or more of files 108, 112, 114, 118 may include static data such as information or data used for calculations (e.g., tables of data). While files 108, 112, 114, 118 are show as being stored in folders 104, 106, 110, 116 in the example of FIG. 1, it should be understood that the data store 102 may store files 108, 112, 114, 118 according to any appropriate organizational format. The data store 102 may be implemented using the hardware, memory, and interface of device 900 described with respect to FIG. 9 below.

Each of the adaptive authorization tokens 120a,b is a device configured to store information for accessing files in the data store 102, collect information about the corresponding user 122a,b, and determine appropriate authorization instructions 132 for the user 122a,b. The authorization tokens 120a,b may provide collected information (e.g., the user attributes 124 and/or the session attributes 126) to the usage tracker 140 (e.g., directly and/or via network 152). As an example, adaptive authorization token 120a may be a stand-alone authorization device such as a united serial bus (USB) device, a device configured for wireless communication (e.g., NFC or Bluetooth), or the like. In these example embodiments, adaptive authorization token 120a generally includes a dedicated processor, memory, and interface (see, e.g., FIG. 9) for implementing the function described in this disclosure. In these cases, the adaptive authorization token 120a is used with a computing device 134 (described below) to facilitate file access. In some cases, as illustrated for adaptive authorization token 120b, the adaptive authorization token 120b may be implemented (e.g., using software) using a computing device such as the smartphone illustrated in FIG. 1. In general, adaptive authorization tokens 120a,b may be implemented using the hardware, memory, and interface of device 900 described with respect to FIG. 9 below. Operation of adaptive authorization tokens 120a,b is described in greater detail below with respect to FIGS. 2-4.

As shown in the example of FIG. 1, the adaptive authorization tokens 120a,b may store user attributes 124, session attributes 126, pre-authorization data 128, and an access signature 130. The user attributes 124 generally include information about the particular user 122*a,b* associated with the respective adaptive authorization token 120*a,b*. For instance, the user attributes 124 may include a username for the user 122*a,b*, information about accounts associated with the user 122*a,b*, information about one or more groups with which the user 122*a,b* is associated, information about the general location of the user 122*a,b* (e.g., the default time zone with which the user is associated), and the like. The user attributes 124 also include information about the user's previous usage of the data store 102. For instance, the user attributes 124 may include information collected over time by the adaptive authorization token 120*a,b* and/or information from the usage tracker 140 (e.g., information associated with the activity and usage log(s) 142, described in greater detail below). The user attributes 124 may be updated when the authorization token 120*a,b* is in use (e.g., when the corresponding user 122*a,b* is requesting access to one or more files 108, 112, 114, 118 of the data store 102) and/or intermittently (e.g., on a predetermined schedule). For example the adaptive authorization tokens 120*a,b*, may activate intermittently to collect location information, as described with respect to the example of FIG. 3C below.

Session attributes 126 generally include information about a current session during which token 120*a,b* is being used (e.g., to authorize access to one or more of the files 108, 112, 114, 118 stored in data store 102). Session attributes 126 are collected by the authorization tokens 120*a,b* when a user 122*a,b* requests access to one or more of the files 108, 112, 114, 118 stored in data store 102. For instance, session attributes may include a description of an activity record, or "path," associated with access request 136. Examples of different usage and activity paths which may be included in session attributes 126 are described below with respect to FIGS. 3A and 3B.

The pre-authorization data 128 generally includes default permissions indicating the contents of the data store 102 that the user 122*a,b* is provisionally permitted to access. Rather than relying on these default permissions alone, however, the adaptive authorization token 120*a,b* may check for any anomalies in the user's activities or usage of the data store 102 before the token 120*a,b*, becomes ac (or "awake") and provides authorization instructions 132 in order to access requested file(s) 108, 112, 114, 118 of the data store 102. The access signature 130 generally includes tokenized credentials (e.g., which may be provided as authorization instructions 132 to the data store 102) for providing user-specific access to the contents of the data store 102.

The adaptive authorization tokens 120*a,b* are generally in an inactive, or "sleeping," state when not in use such that there is a significantly reduced likelihood that a bad actor may intercept information used to gain access to files 108, 112, 114, 118 in the data store 102. For instance, the authorization instructions 132 and any associated credentials (e.g., access signature 130) and/or other secure information is not transmitted (e.g., via NFC, Bluetooth, USB, or the like) when the tokens 120*a,b* are in the inactive state. The tokens 120*a,b* may only become active, or "awake," to transmit appropriate authorization instructions 132 once certain criteria are met, as described in greater detail below with respect to FIGS. 2-4. This improves user security by limiting times during which this secure information can be intercepted by bad actors.

This disclosure encompasses the recognition that it is beneficial to provide user-specific authorization instructions 132 such that files with different security requirements can be stored in the same data store 102, and files 108, 112, 114, 118 accessible to a given user 122*a,b* is limited based on these user-specific authorization instructions 132. In this way, multiple users 122*a,b* with different permission levels (e.g., who are allowed to view different types of information) can store and access information in the same data store 102. For instance, the first user 122*a* may have a first security permission level (e.g., as stored in the pre-authorization data 128). The first security permission level may correspond to allowing access to files marked high security. A highly secure file may include, for example, confidential personal information such as names, birthdays, account numbers, and the like. As such, the first user 122*a* may have access to all of files 108, 112, 114, 118 of the data store 102. The second user 122*b* may have medium-security permissions such that only a subset of the files may be accessed by the second user 122*b*. A third user (not shown for clarity and conciseness of FIG. 1) may have a low-security permissions such that the third user may have access to an even smaller subset of the files 108, 112, 114, 118 of the data store 102. The files to which any of these users 122*a,b* have access may be further adapted based on how the user 122*a,b* is currently using the data store 102, as described in greater detail with respect to FIGS. 2-4 below.

The computing device 134 is generally any computing device (e.g., a computer, smartphone, tablet, or the like) operated by a user 122*a* in order to interact with the data store 102. The computing device 134 generally includes a user interface which facilitates viewing of files 108, 112, 114, 118 of the data store, input of an access request 136 to access one or more of the files 108, 112, 114, 118, receipt of an authorization request 138, transmission of the received request 138 to the authorization token 120*a*, receipt of authorization instructions 132 generated by token 120*a*, and subsequent transmission of these instructions 132 for receipt by the data store 102. Device 134 generally includes an interface that is complementary to a communication type employed by the authorization token 120*a*. For instance, if the token 120*a* is a USB token, device 134 includes at least one USB input. If token 120*a* is an NFC device, device 134 includes at least one NFC receiver. Device 134 is coupled to network 152. Device 134 may be implemented using the hardware, memory, and interfaces of device 900 described with respect to FIG. 9 below.

The usage tracker 140 is generally any device configured to receive user attributes 124 and/or session attributes 126 collected by the adaptive authorization tokens 120*a,b* and store this information in activity and usage log(s) 142. The usage tracker 140 may use the information in log(s) 142 to generate a compliance report 144, which includes a record of events associated with usage of the data store 102. The compliance report 144 may include a list of time-stamped events. Certain events may be flagged for further review (e.g., by a human). For instance, the compliance report 144 may include a record of events identified by the adaptive authorization tokens 120*a,b* and/or the usage tracker 140 which are not consistent with expected usage of the data store and/or expected user activities (see, e.g., FIGS. 2-3C and the corresponding description below). The log(s) 142 may be used to identify trends associated with the use of the data store 102 and identify potential misuse. Usage tracker 140 may be implemented using the hardware, memory, and interfaces of device 900 described with respect to FIG. 9 below.

Encryption module(s) 146 may be any appropriate device for encrypting one or more datasets 96 stored in data store 102. For example, encryption module 146 may be any appropriate device for encrypting one or more of the files 108, 112, 114, 118 stored in data store 102 and/or the folders 104, 106, 110, 116 stored in data store 102. For instance, as shown in the example of FIG. 1, encryption module(s) 146 may provide encryption/decryption instructions 150 to the data store 102. Instructions 150 generally indicate a level at which each block of data 98a through 98n of a dataset 96, stored in data store 102, is to be encrypted as well as corresponding instructions for appropriately decrypting the encrypted blocks of data 98a through 98n. Instructions 150 may also indicate one or more access controls to place on dataset 96, specifying conditions that users 122a,b should satisfy before being permitted access to the encrypted blocks of data 98a through 98n. Encryption module(s) 146 may be implemented using the hardware, memory, and interfaces of device 900 described with respect to FIG. 9 below. In some embodiments, encryption module 146 may be configured to dynamically adjust the encryption levels applied to blocks of data 98a through 98n, based on information available from the usage tracker 140 or other usage and/or activity data made available to encryption module(s) 146, as described in greater detail with respect to FIGS. 5 through 8 below.

Network 152 facilitates communication between and amongst the various components of the application deployment system 100. This disclosure contemplates network 152 being any suitable network operable to facilitate communication between the components of the system 100. Network 152 may include any interconnecting system capable of transmitting audio, video, signals, data, messages, or any combination of the preceding. Network 152 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the data system 100, user 122a may use device 134 to access and interact with the data store 102. For instance, if the user wishes to access file 114 of the data store 102, the first user 122a may input a web address in the device 134 and provide login credentials to allow the user 122a to view contents of the data store 102 (e.g., using a password, a biometric input such as a fingerprint or the like). The user 122a may then navigate to one or more of the files 108, 112, 114, 118 which she/he would like to access. In response to these activities, an access request 136 is transmitted to the data store 102. The access request 136 generally includes an identification of one or more of the files 108, 112, 114, 118 which the user 122a would like to access. The data store 102 then sends an authorization request 138 to determine whether the user 122a is authorized to access the requested file(s) 108, 112, 114, 118.

Upon receiving authorization request 138, the authorization token 120a determines, based on the user's current usage and activity information (e.g., as determined from the collected user attributes 124 and/or session attributes 126) whether authorization to access the requested file(s) 108, 112, 114, 118 should be confirmed or denied for the user 122a. Thus, even if the user 122a may normally have access to the requested file(s) (e.g., based on default pre-authorization data 128 for the user 122a), the authorization token 120a may still deny access to the file(s) (e.g., if the user's current activities do not correspond to expectations, as described in greater detail below with respect to FIGS. 2-4).

If authorization is confirmed, the adaptive authorization token 120a may become active to provide authorization instructions 132 for receipt by the data store 102 along with any appropriate credentials (e.g., associated with the access signature 130) to access the file(s) 108, 112, 114, 118.

Throughout this process the adaptive authorization token 120a may collect information about the user's activities and provide this information to the usage tracker 140 for storage in the activity and usage log(s) 142 and for creation of a compliance report 144. In some cases, information from the usage and activity log(s) 142 and/or the compliance report 144 may be used to adjust how encryption is performed by data store 102 and/or encryption module 146. For instance, encryption module 146 may use the information gathered by usage tracker 140 to classify the data stored in data store 102 according to data type, sensitivity, and/or compliance needs. Then, when a user 122a,b transmits a request 148 seeking dataset 96, encryption module 146 may determine the encryption level to apply to each block of data 98a through 98n of dataset 96, based on the classification assigned to the block of data. Encryption module 146 may also determine a set of access controls to apply to the encrypted data, based on characteristics of the user 122a,b requesting the data. In certain embodiments, encryption module 146 may encrypt dataset 96, based on the determined encryption levels and/or access controls, to generate encrypted dataset 156. In some embodiments, encryption module 146 may provide the determined encryption levels and/or access controls as encryption/decryption instructions 150 to data store 102, and data store 102 may encrypt dataset 96 to generate encrypted dataset 156. In certain embodiments, encryption module 146 may also transmit self-decryption module 158 along with encrypted dataset 156 to user 122a,b as data package 154. Self-decryption module 158 may include self-executing instructions to decrypt encrypted dataset 156 upon receipt by the intended user 122a,b. Encryption module 146 is described in greater detail below with respect to FIGS. 5 through 8.

Adaptive Authorization Token

Figure 2:
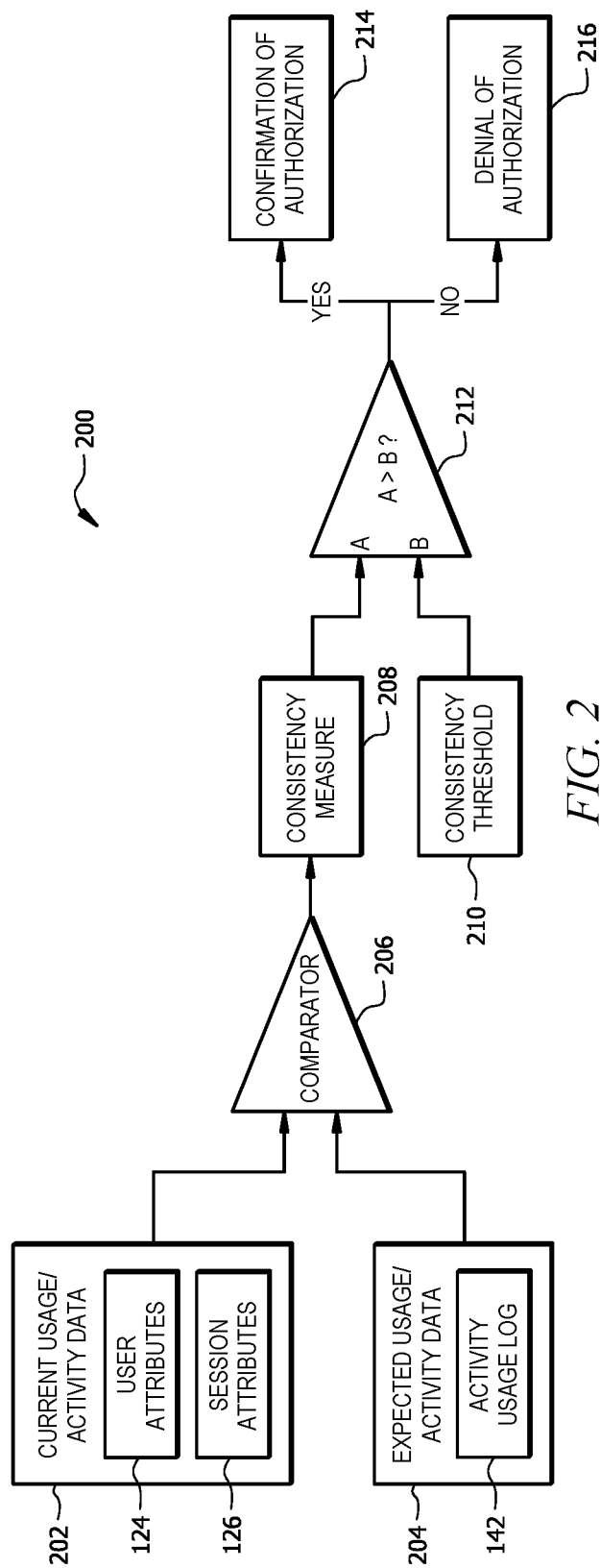
FIG. 2 is a flow diagram illustrating operation of an example adaptive authorization token, for authorizing access to requested file(s) in the data store of FIG. 1.

FIG. 2 is a flow diagram 200 illustrating operation of the adaptive authorization tokens 120a,b. For clarity and conciseness, the example of FIG. 2 is described with respect to functions performed by the first adaptive authorization token 120a associated with user 122a. It should be understood, however, that the operations described with respect to FIG. 2 may be performed by the second adaptive authorization token 120b associated with user 122b. In the example of FIG. 2, the adaptive authorization token 120a determines current usage and/or activity data 202 based on the user attributes 124 and/or session attributes 126 collected by the token 120a and compares this current data 202 to expected usage and activity data 204. The expected usage and activity data 204 may be based on information provided by the usage tracker 134, such as records of previous usage of data store 102 (e.g., as found in the data and activity log(s) 142). Records of previous usage of data store 102 by user 122a and other user activities (e.g., user locations) may also or alternatively be stored locally on the adaptive authorization token 120a. For instance, the user attributes 124 may include a record of such information. Any of these sources of information may be used to determine expected usage and activity data 204, for example, by determining previous activity paths characteristic of the user 122a (e.g., as described below with respect to FIGS. 3A and 3B) and/or establishing expected locations, or geographical zones, from which the user 122a is likely to request authorization to access files 108, 112, 114, 118 of the data store 102 (e.g., as described with respect to FIG. 3C below).

The adaptive authorization token 120*a* may include a first comparator 206, which compares the current usage and activity data 202 to the expected usage and activity data 204 in order to determine a consistency measure 208 between the two. The consistency measure 208 generally corresponds to a quantifiable measure (e.g., a percentage, a fraction, or any other appropriate numerical score) associated with the extent to which the current usage and activity data 202 is the same as, or within a threshold range of, the expected usage and activity data 204. Example operation of the comparator 206 is described in greater detail below with respect to FIGS. 3A-3C.

A second comparator 208 compares the calculated consistency measure 208 to a threshold value 210 (e.g., using the second comparator 212) to determine whether the adaptive authorization token 120*a* should provide a confirmation of authorization 214 (e.g., if the consistency measure 208 is greater than the threshold 210) or a denial of authorization 216 (e.g., if the consistency measure 208 is less than or equal to the threshold 210). Upon confirming authorization, the adaptive authorization token 120*a* may become active (e.g., enter an "awake" state) such that authorization instructions 132 may be provided to the data store 102 (see FIG. 1). The confirmation of authorization 214 may be included in the authorization instructions 132. In some embodiments, the comparator 206 may determine the consistency measure 208 using a machine learning model, which may be trained and/or intermittently, for example, based on information collected over time and stored in the usage and activity log(s) 142.

Figure 3A:
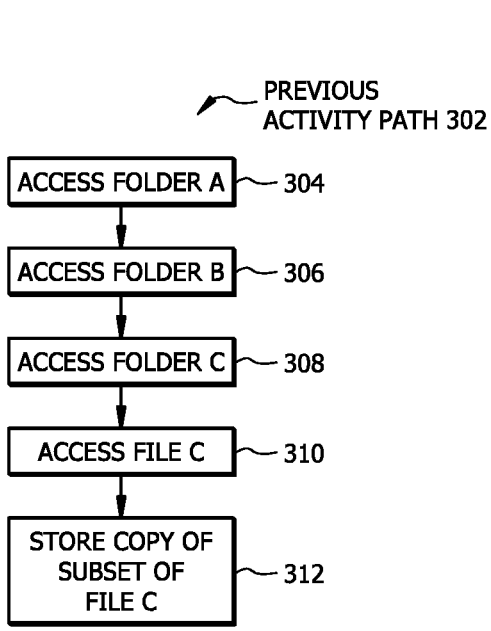
FIGS. 3A and 3B are flow diagrams illustrating user activity paths associated with temporally previous (FIG. 3A) and current (FIG. 3B) use of the data store system of FIG. 1.
Figure 3B:
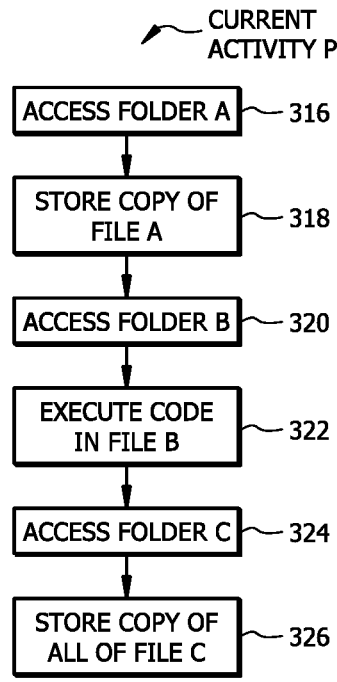

An example of the comparison, by the comparator 206, of current usage and activity data 202 to expected usage and activity data 204 is described in more detail below with respect to FIGS. 3A and 3B. FIGS. 3A and 3B illustrate an example temporally previous activity path 302 (FIG. 3A) (e.g., a collection of recorded actions, which were previously performed by the user 122*a* during use of the data store 102), which may be included in the expected usage and activity data 204, and an example current activity path 314 (FIG. 3B), which may be included in the current usage and activity data 202. The temporally previous activity path 302 of FIG. 3A may be determined based on a record of one or more activities of the user 122*a* during use of the data store 102. For instance, activity path 302 may represent typical usage of the data store 102, one or more other data stores, or a combination of these by the user 122*a*, such that deviations from activity path 302 may be associated with unapproved or malicious activities by the user 122*a*. In the example previous activity path 302 of FIG. 3A, the user 122*a* followed a series of steps 304 to 312 in order to access file C (e.g., file 114 of FIG. 1) and store a copy of a particular subset of the information in this file 114. More particularly, the user 122*a* accessed folder A (e.g., folder 104) at step 304, accessed folder B (e.g., folder 106) at step 306, accessed folder C (e.g., folder 110) at step 308, and accessed file C (e.g., file 114) at step 310. At step 312, the user 122*a* stored a subset of the data stored in file C (e.g., file 114). For example, the user 122*a* may have stored a subset of columns of a table of data stored in file C.

In the example current activity path 314 of FIG. 3B, the user 122*a* follows a series of steps 316 to 326 in order to access the same requested file C (e.g., file 114 of FIG. 1). The current activity path 314 includes a number of steps which are different from the previous path 302 and which may be associated with unapproved and/or malicious activities by the user 122*a* (e.g., activities such as access, storage, and/or execution of files). More particularly, the user 122*a* accesses folder A (e.g., folder 104) at step 316, stores a copy of file A (e.g., file 108) at step 318, accesses folder B (e.g., folder 106) at step 320, executes code stored in file B at step 322, accesses folder C (e.g., folder 110) at step 324, and stores a copy of the entirety of file C at step 326. The current path 314 includes a number of potentially suspicious actions (e.g., copying file A at step 318, executing code at step 322, and copying all of file C at step 326) which are not included in the previous path 302.

Referring gain to FIG. 2, the comparator 206 of FIG. 2 generally identifies the actions which are outliers, or different from, the previous path 302, and determines whether the differences may be unapproved, suspicious, or malicious. For instance, if the activity and usage log(s) 142 indicate the user 122*a* rarely or never executes files of the same type as the requested file, the comparator 206 may calculate a low consistency measure 208 for the current activity and usage data 202 associated with current path 314 (e.g., a consistency measure 208 that is less than or equal to the threshold value 210). As another example, if the activity and usage log(s) 142 indicate that the user rarely or never stores an entire copy of a file that is the same as or similar to the file type of file C (e.g., file 114), the comparator 206 may calculate a low consistency measure 208 (e.g., a consistency measure 208 that is less than or equal to the threshold value 210). However, if according to the activity and usage log(s) 142, copying the entire file C (e.g., file 114) is consistent with normal use of files of the same type as file C, the consistency measure 208 may be high (or may not be decreased). In other words, actions at step 326 of path 314 may be considered to be consistent by the comparator 206 even though a human may otherwise perceive them as seeming anomalous.

Figure 3C:
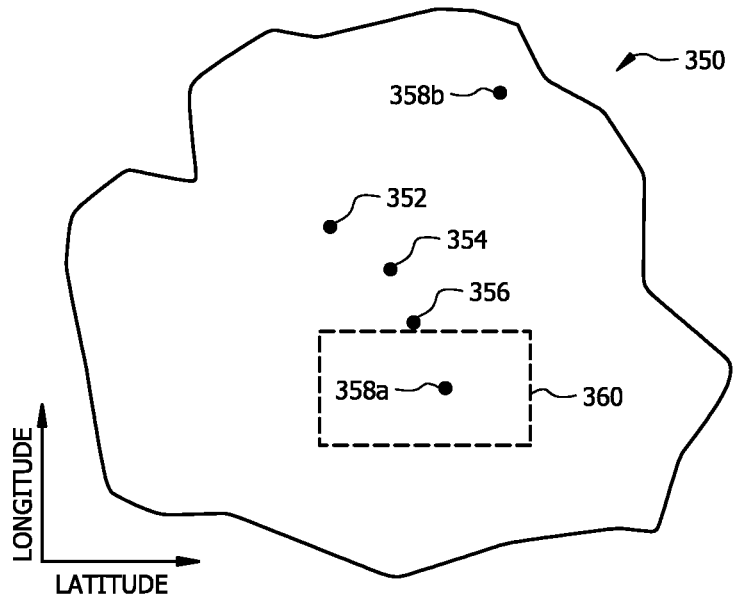
FIG. 3C is a diagram illustrating the determination of consistent and inconsistent data store usage based on location information.

FIG. 3C illustrates a further example of how the comparator 206 of FIG. 2 may calculate a consistency measure 208 based on a location of the adaptive access token 120*a* (e.g., which may be used as a proxy for the location of the user 122*a*). FIG. 3C shows a map 350 of previous positions 352, 354, 356 of the token 120*a* at successive times. In other words, the map 350 illustrates the movement of the token 120*a* over time from position 352 to position 354 and subsequently to position 356. As described above with respect to FIG. 1, the adaptive authorization token 120*a* may become active intermittently to determine and store these previous positions 352, 354, 356 of the device (e.g., as user attributes 124). These positions 352, 354, 356 may be used to determine an expected region 360 within which the token 120*a* is expected to be located at a subsequent time. In general, if the token 120*a* is not located within region 360 at a subsequent time when authorization is requested, the token 120*a* may deny authorization for the user 122*a*.

In one example case, map 350 shows that the current location of the token 120*a* (e.g., when authorization is requested) corresponds to position 358*a*. Since position 358*a* is within region 360, the comparator 206 determines that position 358*a* is consistent with expectations and provides a relatively high consistency measure 208 (e.g., near 100% if the consistency measure 208 is a percentage value). In another example case, map 350 shows that the current position 358*b* of the token 120*a* that is outside of region 360. In this case, the comparator 204 determines that the position 358*b* is inconsistent with expectations and provides a relatively low consistency measure 208 (e.g., nearer to 0% if the consistency measure 208 is a percentage value). In some embodiments, a consistency measure 208 determined from location information is either 100% if the current position is inside the expected region 360 (e.g., as for position 358a) or 0% if the position is outside of the expected region 360 (e.g., as for position 358b). In other embodiments, the consistency measure may be weighted based on a distance from the expected region 360 (e.g., such that the consistency measure 208 gradually decreases with increasing distance from expected region 360).

In some embodiments, the consistency measure 208 is a weighted measure that takes into account both the activity path of the user 122a (e.g., as described with respect to FIGS. 3A and 3B) and the location information of the token 120a (e.g., as described with respect to FIG. 3C). For instance, in some cases, the consistency measure 208 may only be less than the consistency threshold value 210 when both (1) the current activity path of the user 122a is inconsistent with previous paths (e.g., as illustrated in FIGS. 3A and 3B) and (2) the position of the token 120, or the corresponding user 122a, is inconsistent with expectations (e.g., is outside of and/or at least a threshold distance from region 360, as described with respect to FIG. 3C above).

While certain functions (e.g., associated with comparators 206 and/or 212) are described as being performed be the adaptive access token 120a, it should be understood that one or more of these functions may be another component of system 100. In particular, one or more functions or operations described with respect to FIG. 2 may be performed by the usage tracker 140. In some cases it may be preferable to perform these operations at the usage tracker 140, for instance, to decrease the processing and memory requirements of the adaptive authorization tokens 120a,b. However, in other cases, it may be preferable to perform one or more functions or operations at the adaptive authorization tokens 120a,b (e.g., if the usage tracker 140 is unavailable or experiencing high traffic, if it is undesirable to transmit the user attributes 124 and/or session attributes 126 used to determine current usage and activity data 202 due to security concerns, or the like).

In some embodiments, both the adaptive authorization tokens 120a,b and the usage tracker 140 may be configured to perform functions associated with the comparator 206 and/or comparator 208, described above with respect to FIG. 2. In such cases, the adaptive authorization tokens 120a,b may determine whether these functions should be performed by the token 120a,b itself or whether information (i.e., information for determining current usage and activity data 202) should be passed to the usage tracker 140 such that the usage tracker 140 may perform these functions. For instance, the adaptive authorization tokens 120a,b may determine whether the user attributes 124 and session attributes 126 used to determine the current usage and activity data 202 include sensitive information, which should not be transmitted outside of the token 120a,b. In such cases, functions may be constrained to the token 120a,b to limit the risk of compromising this sensitive information. As another example, if a response time of the usage tracker 140 (e.g., a time between when the usage tracker 140 previously received attributes 124, 126 and subsequently provided either a confirmation 214 or denial 216 of authorization) is greater than a threshold time (e.g., of 30 seconds or more), the adaptive authorization tokens 120a,b may perform the authorization functions described with respect to FIG. 2 to avoid delays.

Example Operation of the Data Store System with Adaptive Authorization Tokens

Figure 4:
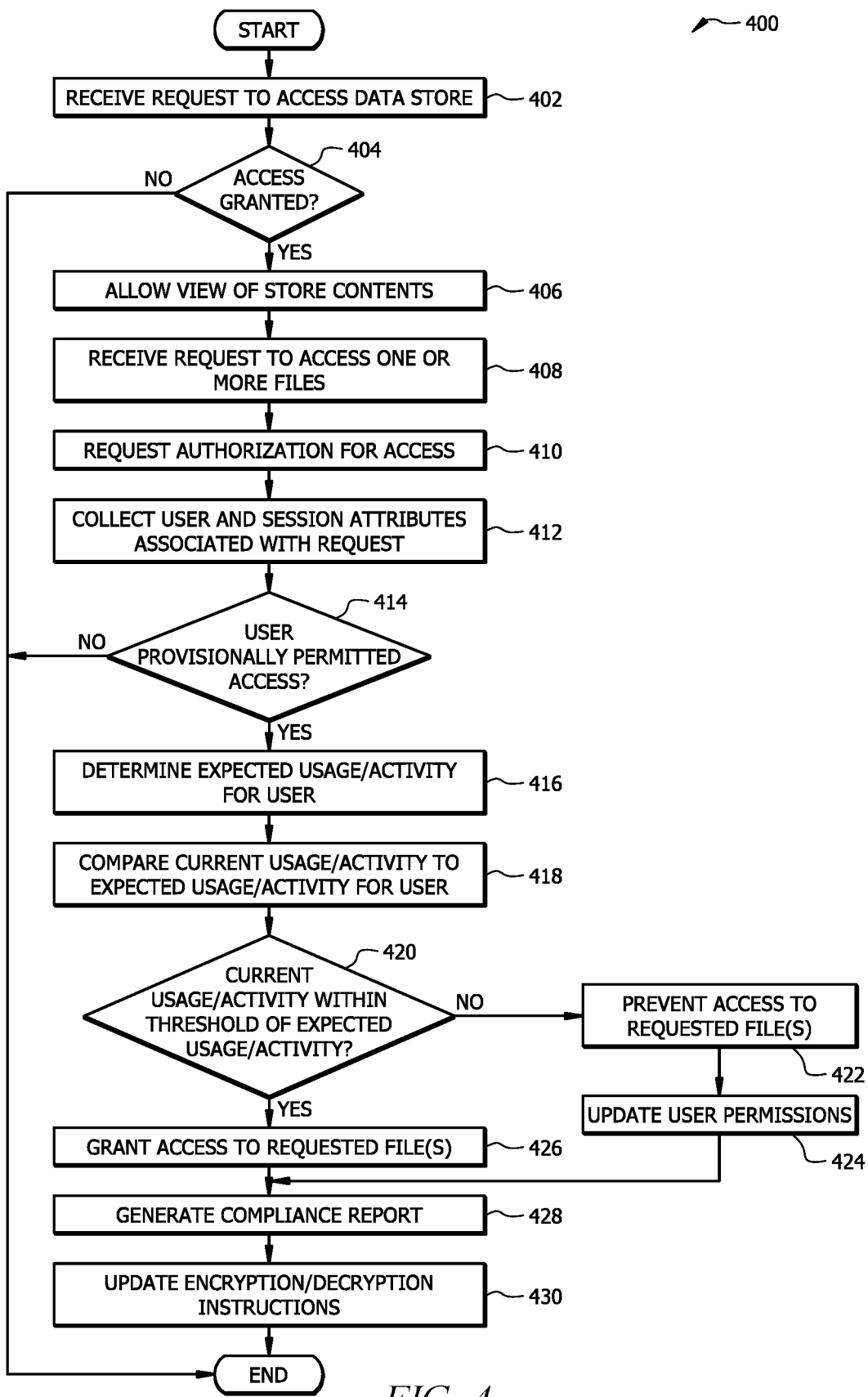
FIG. 4 is a flowchart of a method for operating the data store of FIG. 1, according to an example embodiment.

FIG. 4 is a flowchart 400 illustrating operation of the example data store system 100 illustrated in FIG. 1. Method 400 may begin at step 402 a request is received to access the data store 102. As described above, for example, if the user 122a,b wishes to access file 114 of the data store 102, the user 122a,b may input a web address in the device 134 and provide login credentials to validate the user 122a,b such that a view of the data store 102 is provided (e.g., using a password, a biometric input such as a fingerprint or the like). At step 404, the data store 102 generally determines whether this initial view of the data store's contents should be permitted. For instance, the data store 102 may determine whether login credentials are correct for allowing the user 122a,b to view contents of the data store 102.

If access is granted at step 404, the data store 102 allows the user 122a,b to view contents of the data store 102. For example, user 122a may be provided a view of folders 104, 106, 110, 116 and files 108, 112, 114, 118 via a graphical user interface presented on device 134. Similarly, user 122b may be provided a view of folders 104, 106, 110, 116 and files 108, 112, 114, 118 via a graphical user interface presented on a display of the adaptive authorization token 120b. The users 122a,b may navigate through the contents of the data store 102 and request access to one or more of the files 108, 112, 114, 118 stored in the data store 102.

At step 408, a request 136 to access the one or more selected files of files 108, 112, 114, 118 is received by the data store 102. Following receipt of this access request 136, the data store requests authorization for accessing the selected file(s) at step 410. This request 138 for authorization is generally provided back to the adaptive access token 120a,b and initiates authorization processes of the adaptive access token 120a,b (e.g., as described with respect to FIG. 2 above).

At step 412, the adaptive access token 120a,b collects user attributes 124 and session attributes 126. As described above, the user attributes may include not only predetermined information about the user 122a,b (e.g., username, associated accounts, etc.) but also a history of previous usage of the data store 102 by the corresponding user 122a,b. For instance, the user attributes 124 may include one or more previous activity paths for the user 122a,b (e.g., path 302 described with respect to FIG. 3A above). The session attributes 126 may include a description of a current activity path, such as the current activity path 314 described above with respect to FIG. 3B.

At step 414, the adaptive access token may determine, based on pre-authorization data 128 whether the user 122a,b is provisionally permitted to access the requested file(s) of files 108, 112, 114, 118. Generally, if the user does not have these provisional access permission, access to the file(s) is denied and the method 400 ends. If the user 122a,b is provisionally permitted to accesses the requested file(s) of files 108, 112, 114, 118 (e.g., if predefined permissions grant the user 122a,b access to files of the type requested), the adaptive access token 120a,b proceeds to step 416.

At step 416, the adaptive authorization token 120a,b determines expected usage and activity data 204 for the user 122a,b. For example, as described with respect to FIGS. 2-3C above, the expected usage and activity data 204 may be based on information provided by the usage tracker 134, such as records of previous usage of data store 102 found in the data and activity log(s) 142. Records of previous usage of data store 102 by user 122a,b and other user activities (e.g., user locations) may also or alternatively be stored locally on the adaptive authorization token 120a. For instance, the user attributes 124 may include a record of such information. Any of these sources of information may be used to determine expected usage and activity data 204, for example, by determining previous activity paths characteristic of the user 122a,b (e.g., as described above with respect to FIGS. 3A and 3B) and/or establishing expected locations, or geographical zones 360, in which the user 122a,b is likely to request authorization to access files 108, 112, 114, 118 of the data store 102 (e.g., as described above with respect to FIG. 3C).

At step 418, the adaptive access token 120a,b compares the current usage and activity data 202 (e.g., as determined from the user attributes 124 and/or session attributes 126) to the expected usage and activity data 204 determined at step 416. Various examples of this comparison at step 418 are described above with respect to FIGS. 2-3C. In general, the comparison at step 416 corresponds to determining an extent to which the current usage and activity data 202 is the same as, or within a threshold range of, the expected data 204.

At step 420, the adaptive authorization token 120a,b determines whether the current usage and activity data 202 are within a threshold of the expected data 204 (e.g., whether the consistency measure 208 determined by comparator 206) is greater than consistency threshold 210). If the criteria of step 420 are not met, the adaptive authorization token 120a,b may prevent access to the requested file(s) of files 108, 112, 114, 118 at step 422. For example, the adaptive authorization token 120a,b may remain in an inactive or "sleeping" state. At step 424, the adaptive authorization token 120a,b may optionally update the permissions of the user 122a,b (e.g., as stored in the pre-authorization data 128) such that the user 122a,b will not be provisionally provided access to the requested file(s) in a subsequent attempt to access these files. In other words, the pre-authorization data 128 may be updated such that provisional permission to access files will not be provided at step 414, described above.

If, at step 420, the current data 202 is within the threshold range of the expected data 204, the adaptive authorization token 120a,b may grant access to the user 122a,b to access the requested file(s) of the files 108, 112, 114, 118. Granting access to the file(s) may involve causing the adaptive authorization to become active and provide authorization instructions 132 to the data store 102, such that the user 122a,b may save all or a portion of the requested file(s) and/or execute code stored in the requested file(s).

At step 428, a compliance report 144 may be generated by the usage tracker 144. For instance, the usage tracker 140 may use information in activity and usage log(s) 142 to generate the compliance report 144, which includes a record of events associated with usage of the data store 102 along with any flags associated with whether the events are suspicious and require further review (e.g., by an administrator of the data store 102), as described above with respect to FIG. 1.

At step 430, the information from the usage tracker (e.g., from compliance report 144 and/or activity and usage log(s) 142) may be provided to encryption module(s) 146 in order to update how encryption is handled by data store 102. For example, encryption module 146 may use the information gathered by usage tracker 140 to classify the data stored in data store 102 according to data type, sensitivity, and/or compliance needs. Encryption module 146 may then determine encryption levels to apply to the data, based on the assigned classifications. Examples of updating encryption levels based on user activity and usage information is described in greater detail below with respect to FIGS. 5-8.

Intelligent Encryption

Figure 5:
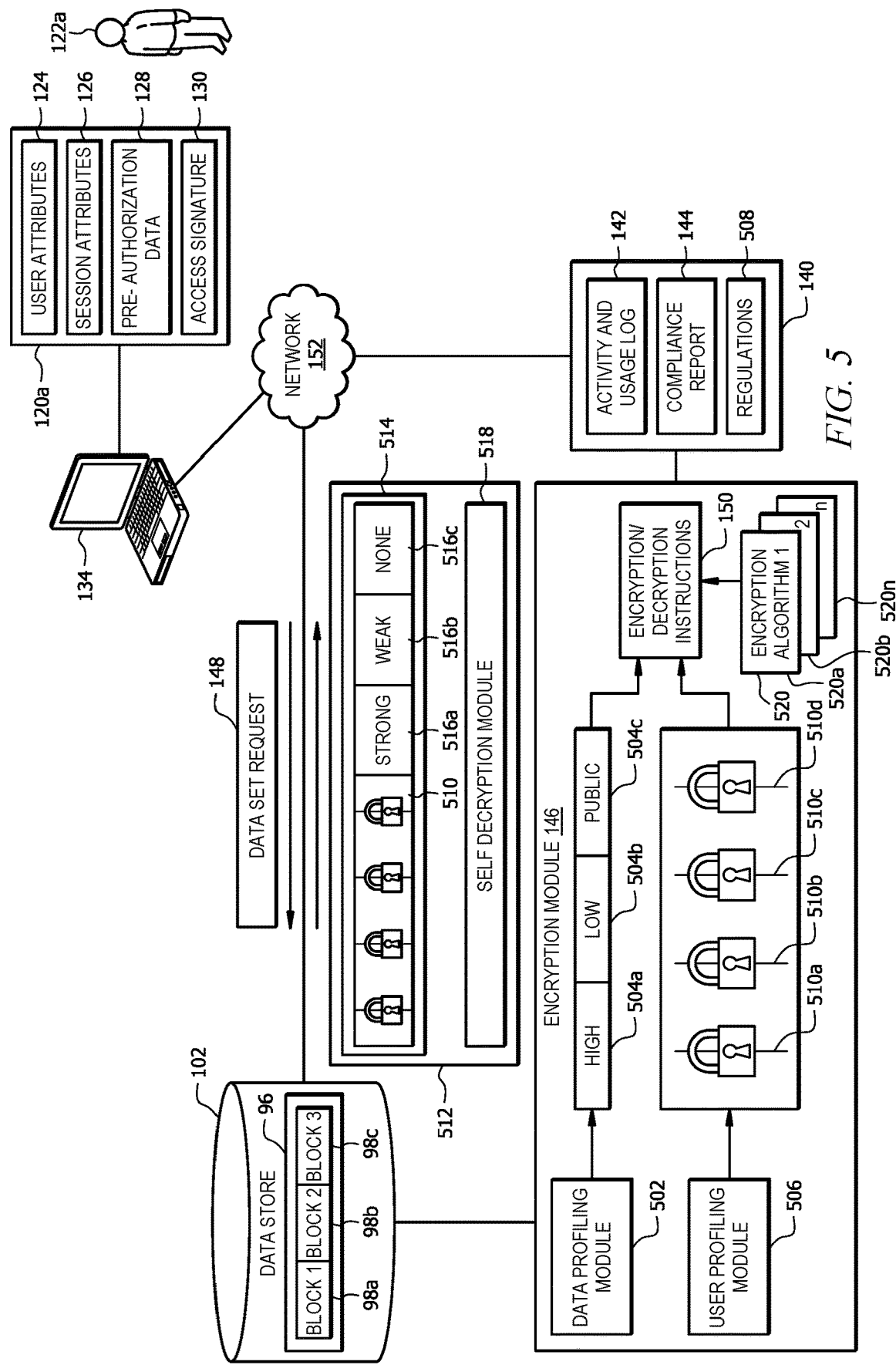
FIG. 5 presents an example operation of the encryption module of the data store system of FIG. 1.

FIG. 5 illustrates an example operation of encryption module 146 of data store system 100 of FIG. 1. In particular, FIG. 5 illustrates the operation of encryption module 146 in response to data store 102 receiving request 148 from user 122a, requesting that data store 102 transmit dataset 96 to device 134. For simplicity, the example presented in FIG. 5 considers a dataset 96 that includes three blocks of data—first block of data 98a, second block of data 98b, and third block of data 98c. However, this disclosure contemplates that encryption module 146 may operate on any size dataset 96.

As illustrated in FIG. 5, in certain embodiments, encryption module 146 includes data profiling module 502 and/or user profiling module 506. Data profiling module 502 is configured to determine a security score (or level of security) 504 for each of data blocks 98a, 98b, and 98c. Security score 504 may indicate a level of encryption to be applied to a given block of data 98. For example, as illustrated in FIG. 5, data profiling module 502 may assign a high security score 504a to first block of data 98a, indicating that a high level of encryption is to be applied to first block of data 98a. Data profiling module 502 may assign a low security score 504b to second block of data 98b, indicating that a low level of encryption is to be applied to second block of data 98b. Data profiling module 502 may assign a security score of "public" to third block of data 98c, indicating that no encryption is to be applied to third block of data 98c, because third block of data 98c includes public information. Security scores 504a through 504c, assigned to blocks of data 98a through 98c, may be of any suitable format. For example, as described above, security scores 504a through 504c may be chosen from a set that includes "high," "medium," "low," "none", "public," and/or any other suitable security level description. As another example, security scores 504a through 504c may be chosen from a numerical range. For example, security scores 504a through 504c may be chosen from the range [0,10], with a value of 10 associated with the highest level of encryption, a value of 1 associated with the lowest level of encryption, and a value of 0 associated with no encryption.

Data profiling module 502 may assign security scores 504 to blocks of data 98 in any suitable manner. As an example, in certain embodiments, data profiling module 502 may assign security scores 504 to blocks of data 98 based at least in part on the data type of the block of data 98. For example, data profiling module 502 may assign a security score (e.g., 504a) to a block of data (e.g., 98a) based in part on whether the block of data is an integer of a certain length, a string, a floating-point number, a Boolean value, and/or any other suitable data type. As a specific example, data profiling module 502 may assign a high security score 504a to a block of data 98a that consists of a number of the format XX-XXX-XXXX, where each X is a numerical digit from 1 to 9, as such a number likely corresponds to a social security number.

In some embodiments, dataset 96 may correspond to a data table, with each block of data 98a through 98c corresponding to a column of data stored in the data table. In such embodiments, data profiling module 502 may assign security scores 504 to columns of data 98a through 98c based at least in part on the type of data stored in each column. For example, data profiling module 502 may assign a high security score 504a to first column 98a, where first column 98a stores social security numbers, account numbers, and/or any other confidential and/or highly valuable information, while data profiling module 502 may assign a lower security score 504b to second column 98b, where second column 98b stores phone numbers, addresses, and/or any non-public information. Data profiling module 502 may assign a security score 504c of "public" to third column 98c, where third column 98c stores data that is publicly available.

As another example, data profiling module 502 may assign a security score 504 to a block of data 98 based on a sensitivity level assigned to the block of data. Such a sensitivity level may be assigned to the data by the organization to which data store 102 belongs, according to the needs and/or preferences of the organization. For example, an organization may assign a high sensitivity level to data, such as trade secrets, generated by members of the organization and available only to internal users of data store system 100 (e.g., users 122a,b located on an internal network 152 rather than an external network 152). The sensitivity levels assigned to data stored in data store 102 may include "trade secret," "confidential," "non-public," "public," and/or any other suitable sensitivity levels. This disclosure contemplates that any number of sensitivity levels may be assigned to data stored in data store 102 and used to determine security scores 504.

In certain embodiments, each dataset 96 and/or each block of data 98 within dataset 96 may include metadata that indicates the sensitivity level assigned to the data. For example, dataset 96 may include metadata indicating that first block of data 98a is highly sensitive data, second block of data 98b is moderately sensitive data, and third block of data 98c is non-sensitive data. In some embodiments, data profiling module 502 may determine the sensitivity level of a block of data 98 based on the user permissions associated with the block of data. For example, data profiling module 502 may determine that third block of data 98c is non-sensitive, where all users 122 are granted read, write, and execute permissions for third block of data 98c. On the other hand, data profiling module 502 may determine that first block of data 98a is highly sensitive where only a subset of internal users 122, and no external users 122, are granted read, write, and execute permissions for first block of data 98a. Data profiling module 502 may also determine that second block of data 98b is moderately sensitive, where all internal users 122 are granted read, write, and execute permissions for second block of data 98b, while external users 122 are only granted read permissions. In certain embodiments, the permissions granted to a user 122a,b may be stored in pre-authorization data 128 of authorization token 120a,b. In some embodiments, the permissions granted to users 122 may be stored in user profiles stored by data store system 100. For example, data store 102 may include such a set of user profiles.

As another example, data profiling module 502 may assign a security score 504 to a block of data 98 based on the compliance needs of the organization to which data store 102 belongs. For example, one or more government regulations 508 may apply to data stored in data store 102. For instance, regulations 508 may require that an organization apply a certain level of encryption, maintain "appropriate safeguards," apply "adequate security procedures," and/or act in any other appropriate manner to protect the integrity and security of confidential consumer information. Accordingly, data profiling module 502 may assign a minimum security score to data that falls under one or more regulations 508, to help ensure compliance with the regulations.

As a further example, in certain embodiments, data profiling module 502 may use information gathered by adaptive authorization tokens 120a,b and/or usage tracker 140 to assign a security score 504 to a block of data 98. For instance, as described above, in certain embodiments, compliance report 144 may include a record of events identified by the adaptive authorization tokens 120a,b and/or the usage tracker 140 which are not consistent with expected usage of data store 102 and/or expected user activities. Such events may indicate situations in which the use of data store 102 may have failed to comply with data security standards imposed by regulations 508 (e.g., such events may indicate potential misuse of the data stored in data store 102). Accordingly, data profiling module 502 may determine that the blocks of data 98 associated with such events are likely sensitive in nature and assign a high security score 504 to such data blocks.

In certain embodiments, data profiling module 502 may determine a security score 504 to apply to each of data blocks 98a, 98b, and 98c in response to data store 102 receiving request 148. In some embodiments, data profiling module 502 may determine an encryption level to apply to each of data blocks 98a, 98b, and 98c in response to the initial storage of each data block 98a through 98c in data store 102. Data profiling module 502 may then update the security scores 504 initially assigned to each of data blocks 98a, 98b, and 98c in response to updated information. For example, data profiling module 502 may update security scores 504 based on (1) the passage of new regulations 508; (2) updates to existing regulations 508; (3) changes in the permissions granted to users 122a,b; (4) information gathered by adaptive authorization tokens 120a,b and/or usage tracker 140 that indicates potential misuse of data blocks 98a, 98b, and/or 98c; (5) information contained in compliance report 144 that indicates potential non-compliance with existing regulations 508; and/or (6) any other situation that may indicate that current security scores 504 should be changed.

This disclosure contemplates that data profiling module 502 may assign security scores 504 to blocks of data 98 based on any of the above methods, any combination of the above methods, and/or any additional methods. In certain embodiments, data profiling module 502 may implement a machine learning algorithm, trained to determine appropriate security scores 504 for blocks of data 98.

Data profiling module 502 may be a software module stored in a memory and executed by a processor. In certain embodiments, data profiling module 502 may be a subroutine of encryption module 146, where encryption module 146 is a software module stored in a memory and executed by a processor. For example, data profiling module 502 and/or encryption module 146 may be implemented using the hardware, memory, and interface of device 900 described with respect to FIG. 9 below. This disclosure contemplates that data profiling module 502 is any module operable to assign security scores to each of the blocks of data 98a through 98c of dataset 96. For example, rather than assigning a single security score to a given file 108, 112, 114, or 118, data profiling module 502 may assign different security scores 504 to different portions of the file. By identifying those portions of a file that contain sensitive and/or confidential information, data profiling module 502 may help to conserve the processing resources otherwise consumed by encrypting an entire file at the highest encryption level, when only a small portion of the file includes such sensitive and/or confidential information.

In certain embodiments, in response to data profiling module 502 assigning security scores 504a through 504c to blocks of data 98a through 98c, encryption module 146 may encrypt blocks of data 98a through 98c according to the assigned security scores. For example, encryption module 146 may encrypt first block of data 98a, assigned high security score 540a, using a strong encryption algorithm 520, to generate encrypted block of data 516a. Encryption module 146 may encrypt second block of data 98b, assigned low security score 504b, using a weak encryption algorithm 520, to generate encrypted block of data 516b. Encryption module 146 may encrypt third block of data 98c, assigned security score 504c of "public," using an even weaker encryption algorithm 520, to generate encrypted block of data 516c. Alternatively, encryption module 146 may choose not to encrypt third block of data 98c. In some embodiments, encryption module 146 may generate encryption/decryption instructions 150 and provide these instructions to data store 102, for data store 102 to encrypt blocks of data 98a through 98c. Instructions 150 may include instructions to apply one or more encryption algorithms 520 to blocks of data 98a through 98c.

Encryption module 146 may apply any number of encryption algorithms 520 to blocks of data 98. As an example, encryption module 146 may assign a given encryption algorithm 520 to each security score 504. For example, encryption module 146 may assign a first encryption algorithm 520a to security score 504a, a second encryption algorithm 520b to security score 504b, and a third encryption algorithm 520c (or no encryption algorithm) to security score 504c. Accordingly, encryption module 146 may apply first encryption algorithm 520a to first block of data 98a, to generate first encrypted block of data 516a; second encryption algorithm 520b to second block of data 98b, to generated second encrypted block of data 516b; and third encryption algorithm 520c to third block of data 98c, to generate third encrypted block of data 516c, based on security scores 504a through 504c assigned to blocks of data 98a through 98c by data profiling module 502.

Encryption algorithms 520 may include any algorithms for encrypting blocks of data, including existing encryption algorithms and/or new encryption algorithms. For example, encryption algorithms 520 may include algorithms that use 128-bit, 256-bit, and/or 512-bit encryption keys. Encryption algorithms 520 may also include split-key encryption algorithms, double encryption algorithms, and/or triple encryption algorithms. Specific examples of encryption algorithms 520 may include the Triple Data Encryption Standard (DES) algorithm, the RSA public-key encryption algorithm, the Blowfish symmetric cypher algorithm, the Twofish encryption algorithm, the Advanced Encryption Standard (AES) algorithm, and/or any other suitable encryption algorithm.

In certain embodiments, encryption module 146 may also include user profiling module 506. In response to receiving request 148 from user 122a for dataset 96, user profiling module 506 is configured to determine a set of one or more access controls to apply to encrypted data 516a through 516c, prior to transmitting the encrypted data to user 122a. Access controls 510 help to secure the contents of the encrypted data transmitted to user 122a, by acting as gates, preventing a user 122 from accessing the encrypted data until the user is able to unlock each gate.

Access controls 510 may be specific to the user (e.g., user 122a) who transmitted request 148 to data store 102, for data (e.g., dataset 96). For example, in certain embodiments, each access control 510a through 510d corresponds to a characteristic/attribute of the user. For example, first access control 510a may correspond to a first characteristic/attribute of user 122a, second access control 510b may correspond to a second characteristic/attribute of user 122a, third access control 510c may correspond to a third characteristic/attribute of user 122a, and fourth access control 510d may correspond to a fourth characteristic/attribute of user 122a. This disclosure contemplates that access controls 510a through 510d may correspond to any suitable characteristics/attributes of user 122a. For example, a given access control (e.g., 510a), may correspond to (1) one of more attributes stored in adaptive authorization token 120a; (2) the network used by user 122a to submit request 148; (3) biometric information belonging to user 122a; (4) the GPS coordinates from which user 122a submitted request 148; (5) the digital signature belonging to user 122a; (6) the data traversal path of request 148; (7) a data access iteration count, indicating the number of times user 122a has previously accessed the data associated with request 148; and/or (8) any other suitable characteristic/attribute of user 122a. A given access control 510a may be configured to deny a user 122 access to the encrypted data to which the access control is attached, if the user does not have the attribute/characteristic of user 122a (who requested the encrypted data through request 148) that is associated with the given access control 510a. For example, consider a situation in which user 122b intercepts encrypted data with access control 510a, where user 122a requested the data through request 148. If access control 510a corresponds to one or more attributes of user 122a, stored in adaptive authorization token 120a, access control 510a may prevent user 122b from accessing the encrypted data, where the one or more attributes of user 122b, stored in adaptive authorization token 120b of user 122b, do not match the one or more attributes of user 122a, stored in adaptive authorization token 120a. If access control 510a is associated with the network by which user 122a submitted request 148, access control 510a may prevent user 122b from accessing the encrypted data, where user 122b is located on a different network from that of user 122a. If access control 510a is associated with biometric information belonging to user 122a, access control 510a may prevent user 122b from accessing the encrypted data, where user 122b does not have the same biometric information as user 122a. If access control 510a corresponds to the GPS coordinates from which user 122a submitted request 148, access control 510a may prevent user 122b from accessing the encrypted data, where the GPS coordinates at which user 122b receives the encrypted data do not match the GPS coordinates from which user 122a submitted request 148. Similarly, if access control 510a corresponds to the digital signature of user 122a, access control 510a may prevent user 122b from accessing the encrypted data, where the digital signature of user 122b does not match the digital signature of user 122a. Additionally, if access control 510a corresponds to the data traversal path of request 148, access control 510a may prevent user 122b from accessing the encrypted data, where the data traversal path of the encrypted data does not match the data traversal path of request 148. Here, the data traversal path of the encrypted data may be considered matching with the data traversal path of request 148 even if the two paths are not identical, provided that any hops in the data traversal path of the encrypted data occur at reasonable geographic locations and do not indicate any tampering of the path. Finally, if access control 510a corresponds to a data access iteration count, indicating the number of times user 122a has previously accessed the data associated with request 148, access control 510a may prevent user 122b from accessing the encrypted data, where user 122b has previously accessed the data a different number of times than user 122a.

This disclosure contemplates that user profiling module 506 may collect the above-described characteristics/attributes of user 122a in any suitable manner. For example, in certain embodiments, in response to user 122a presenting data store 102 with a set of authentication credentials and/or adaptive authorization token 120a, to access data store 102, user profiling module 506 may collect the above-described characteristics/attributes of user 122a and store them in a user profile. Alternatively, a third-party server may be used to collect and store the above-described characteristics/attributes of user 122a.

In certain embodiments access controls 510 may be independent of one another, such that user 122a must satisfy each access control 510a through 510d before gaining access to the encrypted data to which the access controls 510a through 510d are attached. For example, first access control 510a may prevent a user 122 from accessing the encrypted data to which access controls 510a through 510d are attached, if the user does not have the first characteristic/attribute of user 122a, to which first access control 510a corresponds, even if the user has the second characteristic/attribute of user 122a, the third characteristic/attribute of user 122a, and the fourth characteristic/attribute of user 122a, to which second access control 510b, third access control 510c, and fourth access control 510d correspond, respectively. In some embodiments, access controls 510a through 510d may be related to one another, such that a user 122 may be permitted access to the encrypted data to which access controls 510a through 510d are attached, if the user has a prescribed minimum number of the characteristics/attributes of user 122a, to which access controls 510a through 510d correspond. For example, a user 122 may be permitted access to the encrypted data to which access controls 510a through 510d are attached, if the user has at least two of the characteristics/attributes of user 122a, to which access controls 510a through 510d correspond. In some embodiments, certain access controls (e.g., 510a) may be deemed more important than other access controls (e.g., 510b through 510d) and therefore mandatory, such that a user 122 may be permitted access to the encrypted data to which the access controls belong only if the user has the characteristic/attribute of user 122a, corresponding to the mandatory access control, as well as having a prescribed minimum number of the characteristics/attributes of user 122a, to which the remaining access controls belong.

The ratio of mandatory to non-mandatory access controls 510 that may be applied to a given set of encrypted data may depend on the security scores 504 determined by data profiling module 502 for the data. For example, if data profiling module 502 determines that a high security score 504a applies to any of blocks of data 98a through 98c, user profiling module 506 may determine that all of the access controls 510a through 510d to be applied to the encrypted blocks of data 98a through 98c are mandatory, such that a user 122 may be permitted access to the encrypted data to which the access controls belong only if the user has each and every one of the characteristics/attributes of user 122a, to which the access controls correspond. On the other hand, if data profiling module 502 determines that a low security score 504b and/or an security score 504c of "public" applies to all of the blocks of data 98a through 98c, user profiling module 506 may determine that none of the access controls 510a through 510d to be applied to the encrypted blocks of data 98a through 98c are mandatory. Accordingly, a user 122 may be permitted access to the encrypted data to which the access controls belong even if the user does not have each and every one of the characteristics/attributes of user 122a, to which the access controls correspond. Rather, user 122 may be permitted access to the encrypted data to which the access controls belong if the user has a prescribed minimum number of the characteristics/attributes of user 122a, to which the access controls belong.

This disclosure contemplates that user profiling module 506 may generate any number of access controls 510 (including none) to apply to encrypted blocks of data 98a through 98c, transmitted in response to data store 102 receiving request 148. In certain embodiments, user profiling module 506 may determine the number of access controls 510 to apply based at least in part on the characteristics/attributes of the user 122a submitting request 148. For instance, if user 122a is located on an internal network 152, user profiling module 506 may implement a small number of access controls 510. For example, user profiling module 506 may implement a single access control 510, limiting access to users 122 also located on the internal network. As another example, if user 122a is located on an external network 152 at an untrusted geographic location, user profiling module 506 may implement a large number of access controls 510.

In some embodiments, user profiling module 506 may determine the number of access controls 510 to apply to blocks of data 98a through 98c, based at least in part on the security scores 504 assigned by data profiling module 502 to the blocks of data. For example, user profiling module 506 may determine not to apply any access controls 510 to blocks of data 98a through 98c, where data profiling module 502 has assigned a security score 504c of "public" to each block of data 98a through 98c. On the other hand, user profiling module 506 may determine to apply a large number of access controls 510 to blocks of data 98a through 98c, where data profiling module 506 has assigned a high security score 504a to any of the blocks of data 98a through 98c. In certain embodiments, rather than applying the same access controls 510 to each block of data 98a through 98c of the dataset 96 to be transmitted to user 122a, user profiling module 506 may apply different access controls 510 to each block of data 98a through 98c. For example, user profiling module 506 may apply multiple access controls 510 to first block of data 98a, where data profiling module 502 has assigned high security score 504a to first block of data 98a. On the other hand, user profiling module 506 may apply a single access control 510 to second block of data 98b, where data profiling module 502 has assigned low security score 504b to second block of data 98b, and user profiling module 506 may not apply any access controls 510 to third block of data 98c, where data profiling module 502 has assigned security score 504c of "public" to third block of data 98c. Applying fewer access controls to blocks of data 98b and 98c, assigned lower security scores 504 than block of data 98a, may be desirable to reduce the processing resources consumed both in generating and implementing access controls 510, while nevertheless protecting valuable, sensitive, and/or confidential information.

User profiling module 506 may be a software module stored in a memory and executed by a processor. In certain embodiments, user profiling module 506 may be a subroutine of encryption module 146, where encryption module 146 is a software module stored in a memory and executed by a processor. For example, user profiling module 506 and/or encryption module 146 may be implemented using the hardware, memory, and interface of device 900 described with respect to FIG. 9 below. This disclosure contemplates that user profiling module 506 is any module operable to generate a set of access controls 510a through 510d to apply to encrypted data (e.g., encrypted blocks of data 516a through 516c), where the access controls are associated with characteristics/attributes of the user 122a who requested the encrypted data. Access controls 510 may be any suitable measures designed to selectively prevent access to encrypted data 516a through 516c. For example, access control 510*a* may be configured to receive a specific characteristic/attribute from a user 122*b* who intercepted encrypted data 516*a* through 516*c*, and to determine if this characteristic/attribute matches the characteristic/attribute of user 122*a* that is associated with access control 510*a*. If the characteristic/attribute from user 122*b* does not match the characteristic/attribute of user 122*a*, access control 510*a* may be configured to prevent user 122*b* from accessing encrypted data 516*a* through 516*c*. On the other hand, if the characteristic/attribute from user 122*b* does match the characteristic/attribute of user 122*a*, access control 510*a* may be configured to allow user 122*b* to access encrypted data 516*a* through 516*c* (provided that user 122*b* passes any other access controls assigned to the encrypted data). In this manner, user profiling module 506 may add additional security to encrypted data 516*a* through 516*c*, by helping to ensure that only the intended user 122*a* (e.g., the user who transmitted request 148) is able to access the encrypted data.

In certain embodiments, in response to user profiling module 506 generating access controls 510*a* through 510*d*, encryption module 146 may apply access controls 510*a* through 510*d* to encrypted blocks of data 516*a* through 516*c*, to generate encrypted and access-controlled data packet 514. Encryption module 146 may then transmit encrypted and access-controlled data packet 514 to user 122*a*. In some embodiments, encryption module 146 may add access control instructions to encryption/decryption instructions 150 and provide these instructions to data store 102, for data store 102 to apply access controls 510*a* through 510*d* to encrypted blocks of data 516*a* through 516*c*, to generate encrypted and access-controlled data packet 514. Data store 102 may then transmit encrypted and access-controlled data packet 514 to user 122*a*.

Intelligent Decryption

In certain embodiments, in addition to transmitting encrypted and access-controlled data packet 514 to user 122*a*, encryption module 146 may also transmit self-decryption module 518 together with encrypted and access-controlled data packet 514, as a single data package 512. For example, in certain embodiments, encryption module 146 may provide data store 102 with encryption/decryption instructions 150 for data store 102 to bundle self-decryption module 518 with encrypted and access-controlled data packet 514. Self-decryption module 518 may be any module configured to automatically remove access controls 510 and decrypt encrypted data 516*a* through 516*c* upon reception of encrypted and access-controlled data packet 514 by its intended recipient 122*a*. For example, self-decryption module 518 may be a self-executing software module that includes instructions designed to be automatically executed by device 134 of user 122*a*, upon reception by device 134.

Figure 6:
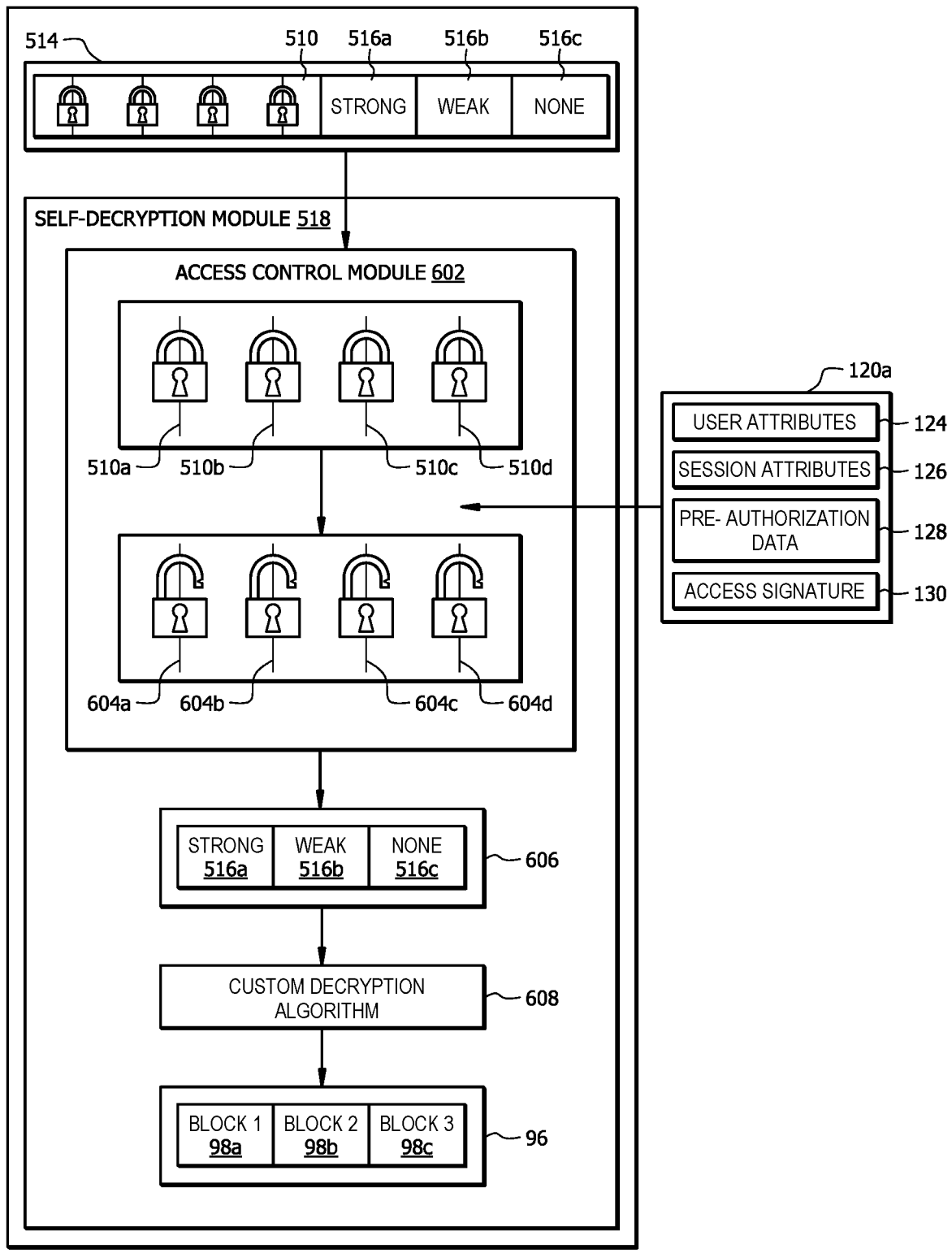
FIG. 6 presents an example operation of the self-decryption module generated by the encryption module of the data store system of FIG. 1 and used to decrypt data encrypted by the encryption module of the data store system of FIG. 1.

FIG. 6 presents an example illustrating the operation of self-decryption module 518 in response to a reception of data package 512 by device 134 of user 122*a*. As illustrated in FIG. 6, data package 512 includes both self-decryption module 518 and encrypted and access-controlled data packet 514. Encrypted and access-controlled data packet 514 includes access controls 510*a* through 510*d* as well as encrypted versions 516*a* through 516*c* of blocks of data 98*a* through 98*c*. As described above, access controls 510 are configured to prevent user 122*a* from accessing encrypted data 516*a* through 516*c* unless the characteristics/attributes of user 122*a* match those associated with each access control 510*a* through 510*d*.

As illustrated in FIG. 6, self-decryption module 518 may include access control module 602 and custom decryption algorithm 608. In certain embodiments, self-decryption module 518 is configured to automatically execute access control module 602, to collect relevant characteristics/attributes of user 122*a* and to provide such characteristics/attributes to each access control 510*a* through 510*d* to determine whether to permit user 122*a* access to encrypted data 516*a* through 516*c*. For example, first access control 510*a* may correspond to one or more attributes stored in the adaptive authorization token 120 of the user 122 who transmitted request 148. Accordingly, access control module 602 may collect the corresponding one or more attributes stored in adaptive authorization token 120*a*, belonging to user 122*a*, who received data package 512, and provide such attributes to first access control 510*a*. If, the one or more attributes stored in adaptive authorization token 120*a* match the one or more attributes associated with first access control 510*a*, first access control 510*a* may open for user 122*a* (illustrated as open gate 604*a* in FIG. 6), thereby no longer preventing user 122*a* from accessing encrypted data blocks 516*a* through 516*c* (although other access controls 510*b* through 510*d* may still prevent such access).

As another example, second access control 510*b* may be associated with the GPS coordinates of the user 122 who transmitted request 148. Accordingly, access control module 602 may collect the GPS coordinates of user 122*a*, who received data package 512, and provide such coordinates to second access control 510*b*. If, the GPS coordinates of user 122*a* match the GPS coordinates associated with second access control 510*b*, second access control 510*b* may open for user 122*a* (illustrated as open gate 604*a* in FIG. 6), thereby no longer preventing user 122*a* from accessing encrypted data blocks 516*a* through 516*c* (although other access controls 510*c* through 510*d* may still prevent such access).

As described above, in certain embodiments, all access controls 510*a* through 510*d* may be mandatory, such that user 122*a* must satisfy each access control 510*a* through 510*d* in order to gain access to encrypted data 516*a* through 516*c*. In some embodiments, user 122*a* may simply need to satisfy a prescribed minimum number of access controls 510*a* through 510*d* to be permitted access to encrypted data 516*a* through 516*c*. For example, user 122*a* may need only satisfy two out of the four access controls 510*a* through 510*d* to be permitted access to encrypted data 516*a* through 516*c*. In certain embodiments, access control module 602 may include instructions indicating which access controls 510*a* through 510*d* and/or how many access controls 510*a* through 510*d* user 122*a* should satisfy in order to be permitted access to encrypted data 516*a* through 516*c*.

If access control module 602 determines that user 122*a* has failed one or more access controls 510*a* through 510*d*, such that user 122*a* should not be permitted access to encrypted data 516*a* through 516*c*, access control module 602 prevents user 122*a* from accessing encrypted data 516*a* through 516*c*. On the other hand, if access control module 602 determines that user 122*a* has passed access controls 510*a* through 510*d*, access control module 602 may provide user 122*a* with access to encrypted data 516*a* through 516*c* as well as custom decryption algorithm 608. Custom decryption algorithm 608 may include a custom set of decryption keys for use in decrypting encrypted data 516*a* through 516*c*. Once access control module 602 has provided user 122*a* with access to custom decryption algorithm 608, self-decryption module 518 may automatically execute custom decryption algorithm 608, thereby decrypting encrypted data 516*a* through 516*c*, to generate blocks of unencrypted data 98*a* through 98*c*.

In certain embodiments, self-decryption module 518 may be a software module generated by encryption module 146 and automatically executed by a processor of device 134 of user 122a, upon reception by device 134. Self-decryption module 518 may be any module operable to collect relevant characteristics/attributes from user 122, provide such attributes to access controls 510, to determine if user 122 is to be permitted access to encrypted data 516a through 516c, and automatically decrypt encrypted data 516a through 516c, in response to determining that user 122 should be permitted access to encrypted data 516a through 516c, based on the characteristics/attributes collected from user 122. While discussed in terms of encryption module 146 generating self-decryption module 518, this disclosure contemplates that any suitable component of data store system 100 may generate self-decryption module 518.

Figure 7:
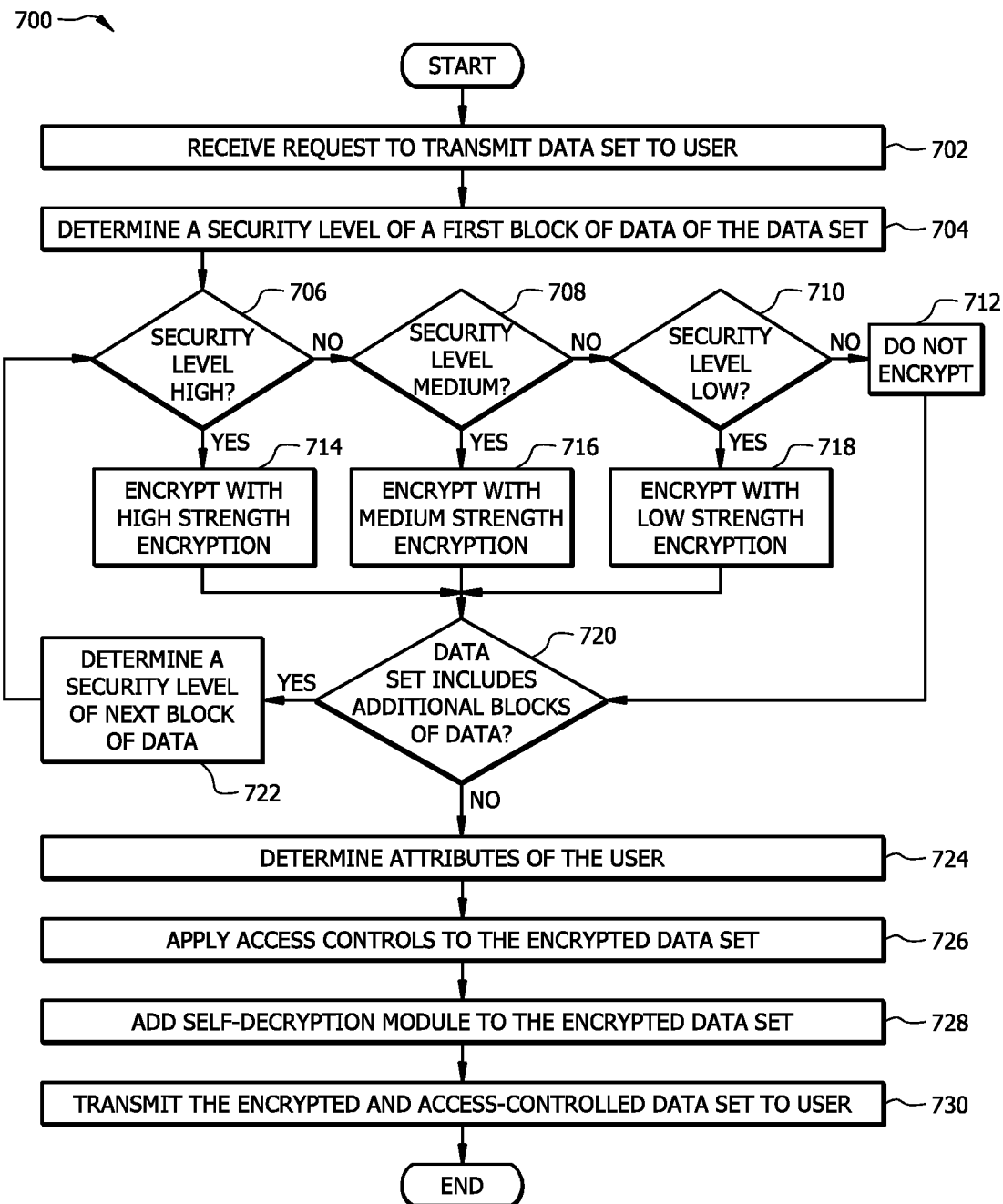
FIG. 7 is a flow diagram illustrating an example operation of the encryption module of the data store system of FIG. 1.

Example Operation of the Data Store System in Response to a Requested Data Transmission FIG. 7 is a flow diagram illustrating an example operation of encryption module 146 of data store system 100. In step 702 data store 102 receives request 148 to transmit dataset 96 to user 122a. Dataset 96 may include any number of blocks of data 98. For example, dataset 96 may include first block of data 98a, second block of data 98b, and third block of data 98c. In step 704 encryption module 146 determines a security score 504 for first block of data 98a. In step 706 encryption module 146 determines whether security score 504 is high. If, in step 706 encryption module 146 determines that security score 504 is high, in step 714 encryption module 146 encrypts first block of data 98a using a high-strength encryption algorithm 520. If, in step 706 encryption module 146 determines that security score 504 is not high, in step 708 encryption module 146 determines whether security score 504 is medium. If, in step 708 encryption module 146 determines that security score 504 is medium, in step 716 encryption module 146 encrypts first block of data 98a using a medium-strength encryption algorithm 520. In, in step 708 encryption module 146 determines that security score 504 is not medium, in step 710 encryption module 146 determines whether security score 504 is low. If, in step 710 encryption module 146 determines that security score 504 is low, in step 718 encryption module 146 encrypts first block of data 98a using a low-strength encryption algorithm 520. If, in step 710 encryption module 146 determines that security score 504 is not low, in step 712 encryption module 146 determines that first block of data 98a corresponds to public information and does not encrypt the data.

In step 720 encryption module 146 determines whether dataset 96 includes any additional blocks of data 98. If, in step 720 encryption module 146 determines that dataset 96 does include additional blocks of data 98, in step 722 encryption module 146 determines an encryption level 504 for the next block of data 98b and returns to step 706, described above. Encryption module 146 may repeat steps 706 through 722 any number of times, depending on the number of blocks of data 98 in dataset 96.

If, in step 720 encryption module 146 determines that dataset 96 does not include any additional blocks of data 98, in step 724 encryption module 146 determines one or more characteristics/attributes of user 122a. In step 726, encryption module 146 applies a set of access controls 510 to the encrypted dataset 96, where each access control 510a through 510d corresponds to one or more of the determined characteristics/attributes of user 122a, to generate encrypted and access-controlled data packet 514. In step 728, encryption module 146 generates self-decryption module 518. As described above, self-decryption module 518 is configured to automatically decrypt the encrypted and access-controlled data packet 514 upon reception by the intended recipient. In step 730, encryption module 146 transmits encrypted and access-controlled data packet 514 to user 122a.

Modifications, additions, or omissions may be made to method 700 depicted in FIG. 7. Method 700 may include more, fewer, or other steps. For example, steps may be performed in parallel or in any suitable order. While discussed as data store system 100 and/or encryption module 146 (or components thereof) performing the steps, any suitable component of system 100, such as data store 102, for example, may perform one or more steps of the method.

Figure 8:
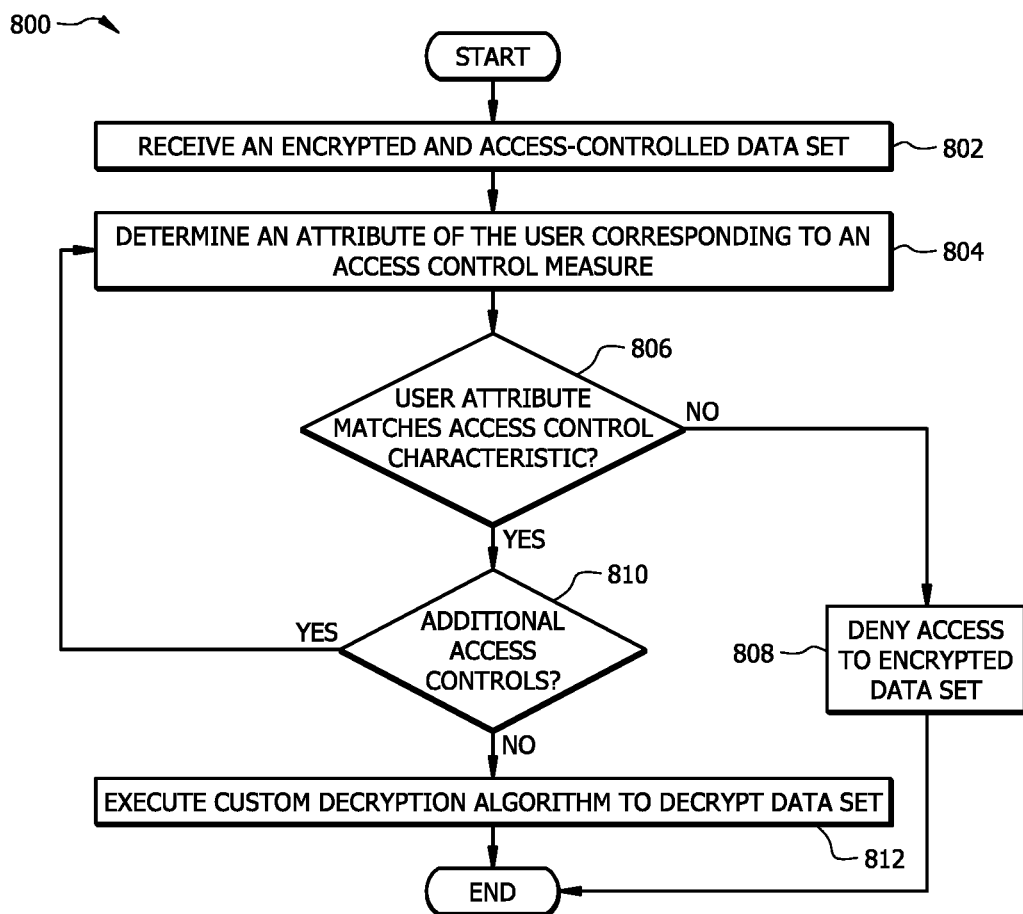
FIG. 8 is a flow diagram illustrating an example operation of a device implementing the self-decryption module generated by the encryption module of the data store system of FIG. 1.

FIG. 8 is a flow diagram illustrating an example operation of a device 134 implementing self-decryption module 518 to decrypt encrypted and access-controlled data packet 514. In step 802, device 134 receives encrypted and access-controlled data packet 514. In step 804, self-decryption module 518 determines a characteristic/attribute of user 122a corresponding to the characteristic/attribute associated with first access control 510a. In step 806, self-decryption module 518 determines whether the characteristic/attribute of user 122a matches the characteristic/attribute associated with first access control 510a. For example, if first access control 510a is associated with the GPS coordinates of the user 122 who requested data packet 514, self-decryption module 518 determines whether the GPS coordinates of user 122a match the GPS coordinates of the user 122 who requested data packet 514. If, in step 806 self-decryption module 518 determines that the characteristic/attribute of user 122a does not match the characteristic/attribute associated with first access control 510a, in step 808 self-decryption module 518 denies user 122a access to encrypted data 516a through 516c.

If, in step 806 self-decryption module 518 determines that the characteristic/attribute of user 122a matches the characteristic/attribute associated with first access control 510a, in step 810 self-decryption module 518 determines whether any additional access controls 510 exist. If, in step 810 self-decryption module 518 determines that additional access controls 510 exist, self-decryption module 518 returns to step 804. Self-decryption module 518 may repeat steps 804 through 810 any number of times, depending on the number of access controls 510 present in encrypted and access-controlled data packet 514.

If, in step 810 self-decryption module 518 determines that no additional access controls 510 exist, in step 812 self-decryption module 518 executes custom decryption algorithm 608 to decrypt encrypted data 516a through 516c.

Modifications, additions, or omissions may be made to method 800 depicted in FIG. 8. Method 800 may include more, fewer, or other steps. For example, steps may be performed in parallel or in any suitable order. While discussed as device 134 and/or self-decryption module 146 (or components thereof) performing the steps, any suitable component of system 100 may perform one or more steps of the method.

Example Devices for Implementing the Data Store System

Figure 9:
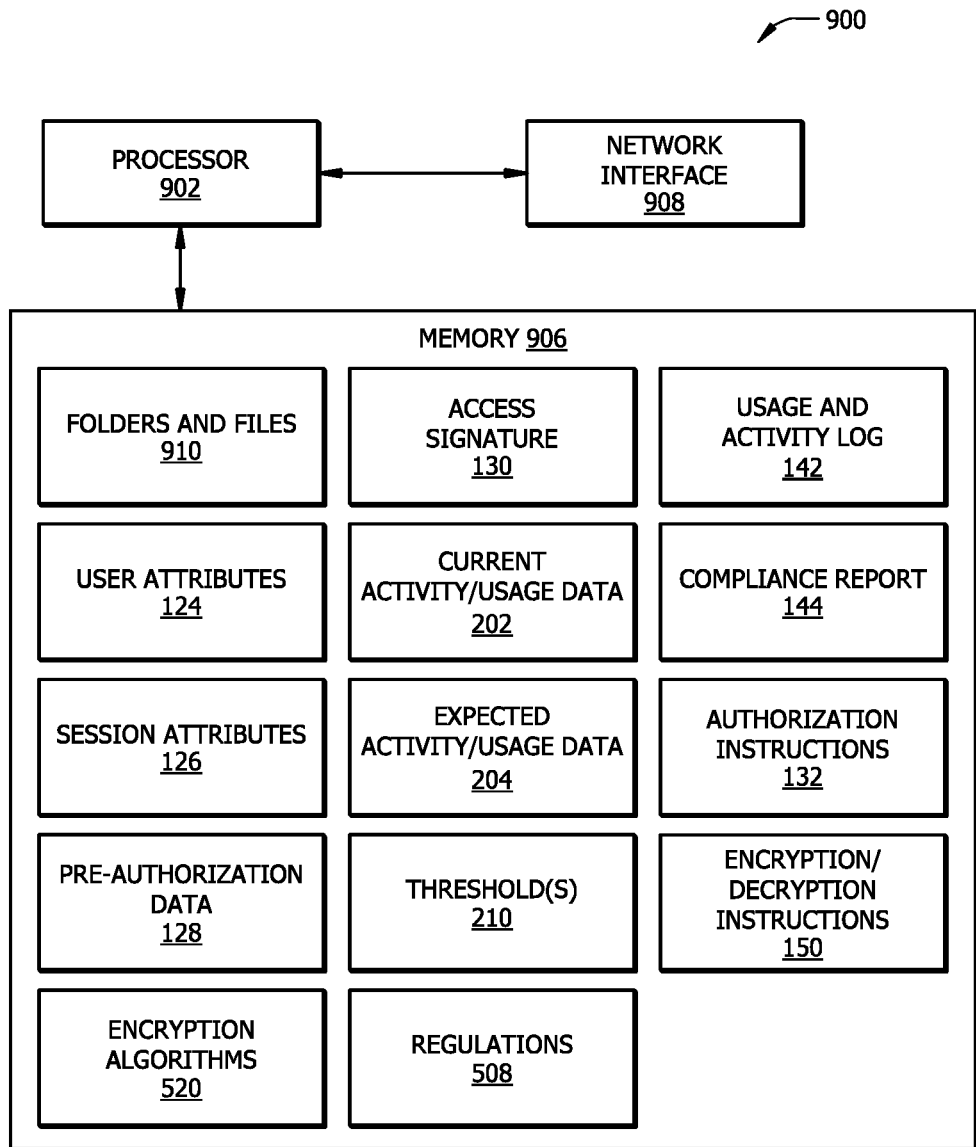
FIG. 9 is a diagram illustrating an example device configured to implement the example system illustrated in FIG. 1.

FIG. 9 is an embodiment of a device 900 configured to implement the application deployment system 100, illustrated in FIG. 1. The device 900 includes a processor 902, a memory 904, and a network interface 906. The device 900 may be configured as shown or in any other suitable configuration. The device 900 may be and/or may be used to implement any one or more of the data store 102, adaptive access tokens 120a,b, computing device 134, usage tracker 140, and encryption module(s) 146 of FIG. 1.

The processor 902 includes one or more processors operably coupled to the memory 904. The processor 902 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 902 may be a programmable logic device, a microcontroller, a microprocessor, or any suitable combination of the preceding. The processor 902 is communicatively coupled to and in signal communication with the memory 904 and the network interface 906. The one or more processors are configured to process data and may be implemented in hardware or software. For example, the processor 902 may be 8-bit, 16-bit, 32-bit, 64-bit or of any other suitable architecture. The processor 902 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of methods 400, 700, and 800. In an embodiment, the function described herein is implemented using logic units, FPGAs, ASICs, DSPs, or any other suitable hardware or electronic circuitry.

The memory 904 is operable to store data for implementing function of the data store 102, the adaptive authorization tokens 120a,b, the computing device 134, the usage tracker 140, and the encryption and decryption modules 146. For example, the memory Z04 may store folders and files 510 (e.g., folders 104, 106, 110, 116 and files 108, 112, 114, 118 of data store 102), user attributes 124, session attributes 126, pre-authorization data 128, access signature 130, current usage and activity data 202, expected usage and activity data 204, one or more thresholds 210, usage and activity log 142, authorization instructions 132, encryption and decryption instructions 150, encryption algorithms 520, regulations 508, and/or any other data or instructions. The instructions may include any suitable set logic, rules, or code operable to execute the function described herein. The memory 904 includes one or more disks, tape drives, or solid-state drives, and may be used as an over-flow data storage device, to store programs when such programs are selected for execution, and to store instructions and data that are read during program execution. The memory 904 may be volatile or non-volatile and may comprise read-only memory (ROM), random-access memory (RAM), ternary content-addressable memory (TCAM), dynamic random-access memory (DRAM), and static random-access memory (SRAM).

The network interface 906 is configured to enable wired and/or wireless communications (e.g., via network 152). The network interface 906 is configured to communicate data between the device 900 and other network devices, systems, or domain(s). For example, the network interface 906 may comprise a WIFI interface, a local area network (LAN) interface, a wide area network (WAN) interface, a modem, a switch, or a router. The processor 902 is configured to send and receive data using the network interface 906. The network interface 906 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A non-transitory computer-readable medium comprising:
   an encrypted dataset comprising:
      a first encrypted block of data, the first encrypted block of data encrypted using a first encryption algorithm; and
      a second encrypted block of data, the second encrypted block of data encrypted using a second encryption algorithm, the second encryption algorithm stronger than the first encryption algorithm;
   a first access control measure configured to selectively prevent access to the encrypted dataset, the first access control measure associated with a first access control characteristic; and
   instructions that are configured, when executed by a hardware processor of a device of a first user, to:
      determine that a first characteristic of the first user matches the first access control characteristic; and
      in response to determining that the first characteristic of the first user matches the first access control characteristic:
         decrypt the encrypted dataset to form a plain text dataset, wherein decrypting the encrypted dataset comprises decrypting the first block of data and decrypting the second block of data; and
         provide the device of the first user access to the plain text dataset.

2. The non-transitory computer-readable medium of claim 1, wherein the first access control characteristic comprises at least one of:
   an authorization parameter;
   a location;
   a digital signature;
   biometric information;
   a data traversal path; and
   a data access count.

3. The non-transitory computer-readable medium of claim 2, wherein the first access control characteristic comprises the authorization parameter and determining that the first characteristic of the first user matches the first access control characteristic comprises determining that an authorization token of the first user comprises the authorization parameter.

4. The non-transitory computer-readable medium of claim 1, wherein the instructions are further configured, when executed by a hardware processor of a device of a second user, to:
- determine that a first characteristic of the second user does not match the first access control characteristic; and
- in response to determining that the first characteristic of the second user does not match the first access control characteristic, prevent the device of the second user from accessing the encrypted dataset.

5. The non-transitory computer-readable medium of claim 1, further comprising:
- a second access control measure configured to selectively prevent access to the encrypted dataset, the second access control measure associated with a second access control characteristic different from the first access control characteristic;
- a third access control measure configured to selectively prevent access to the encrypted dataset, the third access control measure assigned to a third access control characteristic different from the first access control characteristic and the second access control characteristic, wherein decrypting the encrypted dataset to form a plain text dataset is performed in response to determining that at least one of the first characteristic of the first user matches the first access control characteristic, a second characteristic of the first user matches the second access control characteristic, and a third characteristic of the first user matches the third access control characteristic.

6. The non-transitory computer-readable medium of claim 1, further comprising:
- a second access control measure configured to prevent access to the encrypted dataset, the second access control associated with a second access control characteristic different from the first access control characteristic;
- a third access control measure configured to prevent access to the encrypted dataset, the third access control measure assigned to a third access control characteristic different from the first access control characteristic and the second access control characteristic, wherein decrypting the encrypted dataset to form a plain text dataset is performed in response to determining that:
  - the first characteristic of the first user matches the first access control characteristic;
  - a second characteristic of the first user matches the second access control characteristic; and
  - a third characteristic of the first user matches the third access control characteristic.

7. The non-transitory computer-readable medium of claim 1, wherein the instructions comprise:
- a first decryption algorithm configured to decrypt data encrypted by the first encryption algorithm; and
- a second decryption algorithm configured to decrypt data encrypted by the second encryption algorithm.

8. A method comprising:
- receiving, from a device of a first user, a request for a dataset;
- in response to receiving the request for the dataset:
  - generating a data package comprising:
    - an encrypted version of the dataset comprising:
      - a first encrypted block of data, the first encrypted block of data encrypted using a first encryption algorithm; and
      - a second encrypted block of data, the second encrypted block of data encrypted using a second encryption algorithm, the second encryption algorithm stronger than the first encryption algorithm;
    - a first access control measure configured to selectively prevent access to the encrypted dataset, the first access control measure associated with a first access control characteristic; and
    - instructions that are configured, when executed, to:
      - determine that a first characteristic of the first user matches the first access control characteristic;
      - in response to determining that the first characteristic of the first user matches the first access control characteristic, decrypt the encrypted dataset to form a plain text dataset, wherein decrypting the encrypted dataset comprises decrypting the first block of data and decrypting the second block of data; and
  - transmitting the data package to the device of the first user.

9. The method of claim 8, wherein the first access control characteristic comprises at least one of:
- an authorization parameter;
- a location;
- a digital signature;
- biometric information;
- a data traversal path; and
- a data access count.

10. The method of claim 8, wherein the first access control characteristic comprises the authorization parameter and determining that the first characteristic of the first user matches the first access control characteristic comprises determining that an authorization token of the first user comprises the authorization parameter.

11. The method of claim 8 further comprising:
- determining that a first characteristic of the second user does not match the first access control characteristic; and
- in response to determining that the first characteristic of the second user does not match the first access control characteristic, preventing the device of the second user from accessing the encrypted dataset.

12. The method of claim 8, wherein the data package further comprises:
- a second access control measure configured to selectively prevent access to the encrypted dataset, the second access control measure associated with a second access control characteristic different from the first access control characteristic; and
- a third access control measure configured to selectively prevent access to the encrypted dataset, the third access control measure assigned to a third access control characteristic different from the first access control characteristic and the second access control characteristic, wherein decrypting the encrypted dataset to form a plain text dataset is performed in response to determining that at least one of the first characteristic of the first user matches the first access control characteristic, a second characteristic of the first user matches the second access control characteristic, and a third characteristic of the first user matches the third access control characteristic.

13. The method of claim 8, wherein the data package further comprises:
a second access control measure configured to prevent access to the encrypted dataset, the second access control associated with a second access control characteristic different from the first access control characteristic;
a third access control measure configured to prevent access to the encrypted dataset, the third access control measure assigned to a third access control characteristic different from the first access control characteristic and the second access control characteristic, wherein decrypting the encrypted dataset to form a plain text dataset is performed in response to determining that:
the first characteristic of the first user matches the first access control characteristic;
a second characteristic of the first user matches the second access control characteristic; and
a third characteristic of the first user matches the third access control characteristic.

14. The method of claim 8, wherein the instructions comprise:
a first decryption algorithm configured to decrypt data encrypted by the first encryption algorithm; and
a second decryption algorithm configured to decrypt data encrypted by the second encryption algorithm.

15. An apparatus comprising:
a memory; and
a hardware processor communicatively coupled to the memory, the hardware processor configured to:
receive, from a device of a first user, a request for a dataset;
in response to receiving the request for the dataset:
generate a data package comprising:
an encrypted version of the dataset comprising:
a first encrypted block of data, the first encrypted block of data encrypted using a first encryption algorithm; and
a second encrypted block of data, the second encrypted block of data encrypted using a second encryption algorithm, the second encryption algorithm stronger than the first encryption algorithm;
a first access control measure configured to selectively prevent access to the encrypted dataset, the first access control measure associated with a first access control characteristic; and
instructions comprising a first decryption algorithm configured to decrypt data encrypted by the first encryption algorithm and a second decryption algorithm configured to decrypt data encrypted by the second encryption algorithm, wherein the instructions are configured, when executed, to:
determine that a first characteristic of the first user matches the first access control characteristic;
in response to determining that the first characteristic of the first user matches the first access control characteristic, decrypt the encrypted dataset to form a plain text dataset, wherein decrypting the encrypted dataset comprises decrypting the first block of data and decrypting the second block of data; and
transmit the data package to the device of the first user.

16. The apparatus of claim 15, wherein the first access control characteristic comprises at least one of:
an authorization parameter;
a location;
a digital signature;
biometric information;
a data traversal path; and
a data access count.

17. The apparatus of claim 15, wherein the first access control characteristic comprises the authorization parameter and determining that the first characteristic of the first user matches the first access control characteristic comprises determining that an authorization token of the first user comprises the authorization parameter.

18. The apparatus of claim 15, wherein the instructions are further configured, when executed by a hardware processor of a device of a second user, to:
determine that a first characteristic of the second user does not match the first access control characteristic; and
in response to determining that the first characteristic of the second user does not match the first access control characteristic, prevent the device of the second user from accessing the encrypted dataset.

19. The apparatus of claim 15, wherein the data package further comprises:
a second access control measure configured to selectively prevent access to the encrypted dataset, the second access control measure associated with a second access control characteristic different from the first access control characteristic; and
a third access control measure configured to selectively prevent access to the encrypted dataset, the third access control measure assigned to a third access control characteristic different from the first access control characteristic and the second access control characteristic, wherein decrypting the encrypted dataset to form a plain text dataset is performed in response to determining that at least one of the first characteristic of the first user matches the first access control characteristic, a second characteristic of the first user matches the second access control characteristic, and a third characteristic of the first user matches the third access control characteristic.

20. The apparatus of claim 15, wherein the data package further comprises:
a second access control measure configured to prevent access to the encrypted dataset, the second access control associated with a second access control characteristic different from the first access control characteristic;
a third access control measure configured to prevent access to the encrypted dataset, the third access control measure assigned to a third access control characteristic different from the first access control characteristic and the second access control characteristic, wherein decrypting the encrypted dataset to form a plain text dataset is performed in response to determining that:
the first characteristic of the first user matches the first access control characteristic;
a second characteristic of the first user matches the second access control characteristic; and
a third characteristic of the first user matches the third access control characteristic.

* * * * *